United States Patent [19]
Kaish et al.

[11] Patent Number: 5,974,150
[45] Date of Patent: Oct. 26, 1999

[54] SYSTEM AND METHOD FOR AUTHENTICATION OF GOODS

[75] Inventors: Norman Kaish, West Hampstead; Jay Fraser, Freeport; David I. Durst, Syosset, all of N.Y.

[73] Assignee: Tracer Detection Technology Corp., Syosset, N.Y.

[21] Appl. No.: 09/110,315

[22] Filed: Jul. 6, 1998

Related U.S. Application Data

[60] Provisional application No. 60/061,398, Sep. 30, 1997.

[51] Int. Cl.$^6$ .................................................. H04K 1/00
[52] U.S. Cl. ........................................ 380/25; 380/51
[58] Field of Search ................... 380/54, 59, 55, 380/3, 23; 359/2; 283/91, 92, 901, 904

[56] References Cited

U.S. PATENT DOCUMENTS

| | | | |
|---|---|---|---|
| 3,391,479 | 7/1968 | Buzzell et al. | 350/396 |
| 3,701,165 | 10/1972 | Huddlester | 2/243 R |
| 3,839,637 | 10/1974 | Willis | 250/302 |
| 3,880,706 | 4/1975 | Williams | 162/103 |
| 3,942,154 | 3/1976 | Akami et al. | 340/146.3 B |
| 4,138,058 | 2/1979 | Atalla | 235/380 |
| 4,157,784 | 6/1979 | Gröttrup et al. | 235/491 |
| 4,186,943 | 2/1980 | Lee | 283/7 |
| 4,247,318 | 1/1981 | Lee et al. | 156/163 |
| 4,437,935 | 3/1984 | Crane, Jr. | 162/103 |
| 4,514,085 | 4/1985 | Raye | 356/71 |
| 4,552,617 | 11/1985 | Crane | 162/103 |
| 4,623,579 | 11/1986 | Quon | 428/215 |
| 4,652,015 | 3/1987 | Crane | 283/91 |
| 4,710,614 | 12/1987 | Camus | 235/380 |
| 4,767,205 | 8/1988 | Schwartz et al. | 356/71 |
| 4,921,280 | 5/1990 | Jalon | 283/88 |
| 5,289,547 | 2/1994 | Ligas et al. | 382/7 |
| 5,351,302 | 9/1994 | Leighton et al. | 380/30 |
| 5,367,319 | 11/1994 | Graham | 347/2 |
| 5,384,846 | 1/1995 | Berson et al. | 380/23 |
| 5,388,158 | 2/1995 | Berson | 380/23 |
| 5,388,862 | 2/1995 | Edwards | 283/82 |
| 5,393,099 | 2/1995 | D'Amato | 283/91 |
| 5,418,855 | 5/1995 | Liang et al. | 380/23 |
| 5,420,924 | 5/1995 | Berson et al. | 380/23 |
| 5,426,700 | 6/1995 | Berson | 380/23 |
| 5,499,924 | 3/1996 | Arisaka et al. | 439/67 |
| 5,549,953 | 8/1996 | Li | 428/64.1 |
| 5,574,790 | 11/1996 | Liang et al. | 380/23 |
| 5,580,950 | 12/1996 | Harris et al. | 528/350 |
| 5,591,527 | 1/1997 | Lu | 428/411.1 |
| 5,592,561 | 1/1997 | Moore | 382/103 |
| 5,601,683 | 2/1997 | Martin | 156/277 |
| 5,719,939 | 2/1998 | Tel | 380/23 |
| 5,799,092 | 8/1998 | Krastol et al. | 380/51 |

OTHER PUBLICATIONS

VanWiggern and Roy, "Communication w/ Chaotic Lasers," *Science* 279:pp. 1198–1200 Feb. 20, 1998.

Garthier, D.J., "Chaos Has Come Again," *Science* 279:pp. 1156–1157 Feb. 20, 1998.

*Primary Examiner*—Tod R. Swann
*Assistant Examiner*—Trevor Coddington
*Attorney, Agent, or Firm*—Mild, Hoffberg & Macklin, LLP

[57] ABSTRACT

An authentication system comprising a medium having a plurality of elements, the elements being distinctive, detectable and disposed in an irregular pattern or having an intrinsic irregularity. Each element is characterized by a determinable attribute distinct from a two-dimensional coordinate representation of simple optical absorption or simple optical reflection intensity. An attribute and position of the plurality of elements, with respect to a positional reference is detected. A processor generates an encrypted message including at least a portion of the attribute and position of the plurality of elements. The encrypted message is recorded in physical association with the medium. The elements are preferably dichroic fibers, and the attribute is preferably a polarization or dichroic axis, which may vary over the length of a fiber. An authentication of the medium based on the encrypted message may be authenticated with a statistical tolerance, based on a vector mapping of the elements of the medium, without requiring a complete image of the medium and elements to be recorded.

52 Claims, 4 Drawing Sheets

2

SYSTEM AND METHOD FOR AUTHENTICATION OF GOODS

The present application claims the benefit of priority from copending U.S. Provisional Patent Application Serial No. 60/061,398 filed on Sep. 30, 1997.

RELATED APPLICATIONS

The present application is related to Ramsey et al., U.S. patent application Ser. No. 08/141,389, "Counterfeit-Resistant Materials and a Method and Apparatus for Authenticating Materials", assigned to Martin Marietta Energy Systems, Inc.

A portion of the information contained herein was developed under contract No. DE-AC05-84OR21400 between the U.S. Department of Energy and Martin Marietta Energy Systems, Inc. The U.S. government may therefore hold certain rights therein.

FIELD OF THE INVENTION

The present invention relates to the field of authentication and counterfeit detection, and more specifically to systems employing self-authenticating schemes allowing determination of object authenticity by evaluation of a non-duplicable and/or encrypted code.

BACKGROUND OF THE INVENTION

The issues of authentication and counterfeit deterrence can be important in many contexts. Bills of currency, stock and bond certificates, credit cards, passports, bills of lading, as well as many other legal documents (e.g., deeds, wills, etc.) All must be reliably authentic to be useful. Authentication and avoidance of counterfeiting can also be important in many less obvious contexts. For example, improved verification/counterfeiting prevention mechanisms would be very useful in, for example, verifying the contents of shipping containers, quickly identifying individuals with particular health or criminal histories, etc. Counterfeit products are, by definition, unauthorized copies of a product, its packaging, labeling, and/or its logo(s). Attractive targets for counterfeiters are items with significant brand equity or symbolic value, where the cost of production is below the market value.

In the commercial manufacturing world, it is not uncommon for counterfeit or otherwise unauthorized goods to be manufactured, distributed, and sold in direct competition with authentic goods. Counterfeiting has reached epidemic proportions worldwide, especially in the area of consumer goods including goods made from fabric, plastic, leather, metal, or combinations thereof such as clothing, handbags and wallets, perfumes, and other consumer goods. Electronics and software products are also particular targets of counterfeiters, who appropriate the value of trademarks or copyrights without license. Since costs savings based on decreased incremental cost of production (exclusive of license fees) is not a necessary element in the counterfeiting scheme, the counterfeit articles may be of apparently high quality and closely resemble authentic articles. Indeed, counterfeit articles can so closely resemble genuine goods that consumers readily confuse the counterfeit articles with the authentic articles. In other circumstances, the manufacturer segments the world market for different sales and distribution practices, so that the "counterfeit" goods may be essentially identical to authorized goods. Further, in many instances, a manufacturer produces goods under license from an intellectual property owner, and thus sales outside the terms of the license agreement are also "counterfeit".

In the U.S. alone, crime and/or fraud prevention is a multi-billion dollar market. In the commercial sector, the marking of every day products such as jeans, cosmetics and compact disk/video tapes, software, etc. can prevent the counterfeiting (bootleg) and import of fraudulent copies unauthorized by the legitimate producers.

A wide variety of attempts have been made to limit the likelihood of counterfeiting. For example, some have tried to assure the authenticity of items by putting encoded or unencoded markings thereon (e.g., an artist's signature on his or her painting). Unfortunately, as soon as the code is broken—e.g., a counterfeiter learns to duplicate a signature, this method becomes worthless for authentication purposes. In the context of paper products (e.g., currency), counterfeiting-prevention methods have also used two-dimensional authentication mechanisms—e.g., watermarks or special threads incorporated within the paper used to make the currency. These mechanisms are clearly helpful, but they can also be overcome. For example, counterfeiters routinely bleach a one-dollar bill (in such a way that the colored threads that mark the special currency paper are not damaged) and then imprint the markings of a one hundred-dollar bill thereon. Thus, the mere release of physical security materials into the market forms one limitation on their unfettered use.

Other authentication methods have utilized mechanisms that provide three dimensions of data. For example, the holograms provided on many credit cards provide more variables (i.e., relative to two-dimensional threads or watermarks) which may be precalibrated, and thereafter, used to verify the authenticity of an item. Nevertheless, since holograms have a pre-set, or deterministic, pattern they may also be duplicated and counterfeit products made. Further, since the holograms are invariant, they are subject to pilferage before application to goods, or translocation from authorized to unauthorized goods in the marketplace. Authentication mechanisms, which utilize deterministic patterns, are inherently vulnerable to counterfeiting since the counterfeiter, in essence, has a "fixed" target to shoot at. High security schemes, such as military codes, have encryption keys that change frequently. This method, however, assists prospectively in securing valuable time-sensitive information, and does not prevent subsequent decryption of a previously transmitted message. At the other end of the spectrum, a random element-based authentication mechanism would provide an incessantly "moving" and nonrepeating target that would be practically impossible to undetectably duplicate, without knowledge of the encoding scheme.

Finally, although existing authentication mechanisms provide adequate protection against counterfeiting in some contexts, increasingly powerful tools are available to decode encrypted messages, making more secure schemes necessary for long-term protection. For example, in conjunction with its monitoring and surveillance activities, governments routinely seek to break or circumvent encryption codes. The technologies employed are then quickly adopted by the private sector, and indeed government regulations seek to maintain weak encryption standards, facilitating codebreaking. In addition to computers, current counterfeiters have access to extremely powerful tools for undermining physical copy-protection schemes—e.g., color photocopying equipment, reverse engineering of semiconductor chips, etc. These factors have combined to continually provoke strong demand for new methods and mechanisms for authenticating items, especially methods and mechanisms that are less vulnerable to counterfeiting and/or employ new copy-protection mechanisms.

The security issue for a broad class of labeled consumer goods, in one sense, boils down to whether someone can mass produce a counterfeit label with a corresponding security code without being detected. At one extreme, a simple photocopy of a label would indeed work if the scanner simply looked for the location of indicia, such as two-dimensionally located fibers. The use of fluorescent fibers would require the scanner to properly illuminate the fibers to cause them to fluoresce and discriminate against a fiber that fluoresces with the wrong color. Dichroic fibers would require discrimination against fibers that differentially reflect or transmit light based on the polarization as well as color of illuminating source, and means for duplicating the pattern once detected. Clearly, the more factors that are involved the better. Thus, security features, which require specialized equipment to measure and duplicate are preferred measures.

One issue, which arises in existing technologies, is the robustness of the scheme in distinguishing authentic from counterfeit. If the authentication scheme is too strict, genuine articles will be rejected due to minor variations, such as environmental changes or exposure, deformation, or the like. On the other hand, if the authentication scheme is not strict, counterfeit goods may pass, or counterfeiters may learn to fool the authentication system into authenticating counterfeit goods on a regular basis.

PRIOR ART

ANTI-COUNTERFEITING LABEL SCHEMES

U.S. Pat. No. 5,592,561, incorporated herein by reference, suggests a system that provides an authenticating, tracking/anti-diversion, and anti-counterfeiting system that can track various goods. The system includes a control computer, a host computer, a marking system, and a field reader system, which are all compatible and can be physically linked via data transmission links. An identifiable and unique mark is placed on each good, or on materials out of which the goods are to be made, which enables subsequent inspection. The marks or patterns include areas where a marking agent is applied in an encrypted pattern and areas where it is not applied. The pattern can be scanned or captured by a reader and deciphered into encoded data. The entry can then either be compared directly to a set of authentic entries on a database or decoded and compared to a set of data on the centrally located host database. The marking system provides control over imprinting, allowing a limited number of authorized codes to be printed before reauthorization is required. In order to provide marking validation, a camera captures images of imprints. After imprinting of the encoded marking, an image of the marking is obtained and centrally authenticated as a valid code, which may be stored in a database along with stored pertinent information pertaining to this specific product. Monitoring of the marked goods is facilitated by including a unique encrypted pattern having, for example, a unique owner identifier, a unique manufacturer identifier, a unique plant identifier, a unique destination identifier, and time and date information.

U.S. Pat. Nos. 5,367,148, 5,283,422, and 4,814,589, incorporated herein by reference, provide systems for detecting counterfeit objects by employing ID codes having random number components which are stored in a database of authorized ID codes.

U.S. Pat. No. 5,367,319, incorporated herein by reference, provides a system wherein an object, such as currency, is randomly marked, such as with an ink jet printer. Counterfeiting of the object by copying is detected by sensing duplication of the random pattern.

SELF-AUTHENTICATING IMPRINTED CODES

WO 97/25177, Shachrai et al., incorporated herein by reference, relates to a gemstone marking method and apparatus, in which, in one embodiment provides an encryption code which is inscribed on the gemstone which is based, in part, on a random or irreproducible characteristic of the gemstone.

U.S. Pat. No. 5,499,924, incorporated herein by reference, relates to a digital camera with an apparatus for authentication of images produced from an image file. U.S. Pat. No. 5,351,302, incorporated herein by reference, relates to a method for authenticating objects based on a public key cryptography method encoding an ascertainable characteristic of the object, such as a serial number.

PHYSICAL SECURITY SCHEMES—OPTICAL

U.S. Pat. No. 5,574,790, incorporated herein by reference, provides a multiple-reader system for authentication of articles based on multiple sensed fluorescent discriminating variables, such as wavelengths, amplitudes, and time delays relative to a modulated illuminating light. The fluorescent indicia incorporates spatial distributions such as bar codes as discriminating features, to define a user-determined and programmable encryption of the articles' authentic identity.

U.S. Pat. No. 4,623,579, incorporated herein by reference, discloses a decorative composite article, which may be longitudinally slit to form a yarn product, which has a combined phosphorescent and fluorescent decorative appearance. The composite article includes paired outer layers of a thermoplastic resin between which is disposed a decorative layer comprising a composition including a colorant component having a phosphorescent colorant and a fluorescent colorant, and a resin binder material. The fluorescent colorant is present in an amount by weight that is up to an amount equal to that of the phosphorescent colorant. The present binder material may be selected from polyester, polyurethane and acrylic polymers and copolymers, with a mixture of butadiene-acrylonitrile rubber and polyurethane composition being preferred. The composite article is prepared by coating two resin films with the composition, followed by contacting the films with each other on their coated surfaces and applying heat and pressure to bond them together to form the decorative composite article.

U.S. Pat. No. 3,942,154, incorporated herein by reference, discloses a method and apparatus for recognizing colored patterns. The method includes encoding the colors of individual picture elements in a fabric pattern by comparing the level of transmittance or reflectance of the picture element at pre-selected wavelengths with stored values representing a reference color to generate a multibit code indicative of the color of the picture element. A comparator used for this purpose incorporates an error either proportional to the wavelength or of constant value so that the output of the comparator will indicate identity with the stored value if the input value for the picture element is within a certain range of the stored value.

U.S. Pat. No. 3,839,637, incorporated herein by reference, discloses the impregnation of spaced courses of yarn in a fabric with a material which is not visible under daylight, but which is visible only when subjected to ultra-violet light, so as to provide guide lines for cutting, or measuring indicia to enable visual counting of the number of yards of cloth in a roll from the end thereof without the necessity of unrolling the bolt.

U.S. Pat. No. 5,289,547, incorporated herein by reference, discloses a method for authenticating articles including incorporating into a carrier composition a mixture of at least two photochromic compounds that have different absorption maxima in the activated state and other different properties to form the authenticating display data on the article, subjecting the display data to various steps of the authenticating method, activation of all photochromic compounds, preferential bleaching of less than all of the photochromic compounds, and/or bleaching of all the photochromic compounds, and subsequent examination of the display data following the various activation and bleaching steps by verifying means to enable authentication.

U.S. Pat. No. 4,767,205, incorporated herein by reference, discloses an identification method and identification kit based upon making up groups of microsized particles normally visible to the naked eye with each particle in each group being of a selected uniform size, shape and color. Coded identification is established by transferring a population of particles from a selected number of the groups to the item to be identified and then confirming such identification by examining the marked item under high magnification with a light microscope.

U.S. Pat. No. 4,883,332, incorporated herein by reference, discloses a scanning fluorescent detection system.

U.S. Pat. No. 5,591,527, incorporated herein by reference, provides optical security articles and methods for making same, having layers of varying refractive index forming an image, which is viewable only across a narrow range of viewing angles and is viewable in ambient (diffuse) light, thus affording a readily apparent verification of the authenticity of the substrate.

U.S. Pat. No. 5,580,950, incorporated herein by reference, provides negative birefringent rigid rod polymer films, formed of a class of soluble polymers having a rigid rod backbone, which when used to cast films, undergo a self-orientation process aligning the polymer backbone parallel to the film surface, resulting in a film that displays negative birefringence.

U.S. Pat. No. 5,549,953, incorporated herein by reference, provides optical recording media having optically variable security properties. Thin film structures, which have an inherent color shift with viewing angle, provide both optically variable security properties and optical data decodable by optical means. The multilayer interference coating has a dielectric material, which is transparent, and a recording layer made of a light absorbing material, a crystalline-structural changing material, or a magneto-optic material. Data is encoded optically or photolithographically as bar codes or digital data.

PHYSICAL SECURITY SCHEMES—PRINTED

The use of optically variable pigments has been described in the art for a variety of applications, such as inks for counterfeit-proof applications such as currency, and generically for coating compositions. They are described, for example, in U.S. Pat. Nos. 4,434,010, 4,704,356, 4,779,898, 4,838,648, 4,930,866, 5,059,245, 5,135,812, 5,171,363, and 5,214,530, incorporated herein by reference. Pigments of these types are prepared by depositing inorganic transparent dielectric layers, semi-transparent metal layers, and metal reflecting layers onto a flexible web, and separating the layers from the web in such a manner as to fragment the deposited thin film layer structure into pigment particles. These particles are in the form of irregularly shaped flat pigment flakes. These pigments are capable of producing dramatic visual effects, including dichroic effects not observed in other types of pigments. A multilayer thin film interference structure is formed having at least one metal reflecting layer, at least one transparent dielectric layer, and at least one semi-transparent metal layer. Various combinations of these layers can be utilized to achieve the desired optically variable effect. Layer thickness can be varied according to the particular desired characteristics of the pigment. For example, U.S. Pat. No. 5,135,812, incorporated herein by reference, describes useful thickness being on the order of 80 nm for the metal reflecting layer, 5 nm for the semi-opaque metal layers, and thickness of a plurality of halfwaves of the particular design wavelength for the transparent dielectric layers.

U.S. Pat. Nos. 5,193,853, and 5,018,767, incorporated herein by reference, provide anticounterfeiting methods wherein a marked image has a minute dot or line pitch which varies from normal scanning resolution of typical copying devices, making such mechanical copying detectable.

U.S. Pat. No. 4,514,085, incorporated herein by reference, provides a method for authenticating documents by marking the document with an encapsulated liquid crystal, and then observing the document under conditions which exploit the unique optical characteristics of liquid crystals.

U.S. Pat. No. 4,507,349, incorporated herein by reference, provides a currency security system employing synthetic layers and sublimatable dye-formed images on the layers.

U.S. Pat. No. 5,601,683, incorporated herein by reference, provides a photocopy resistant document, having a background pattern or logo which is printed with solvent-sensitive, dye based ink. The presence of this photocopy-resistant background pattern or logo limits copying.

PHYSICAL SECURITY SCHEMES—ELECTROMAGNETIC

U.S. Pat. No. 5,602,381, and U.S. Pat. No. 5,601,931, incorporated herein by reference, relate to system and method for authenticating labels based on a random distribution of magnetic particles within the label and an encrypted code representing the distribution printed on the label, and possibly data imprinted on the label.

U.S. Pat. No. 3,701,165, incorporated herein by reference, discloses a method of marking garments with a substance detectable by magnetic detecting devices. When the magnetized substance on the garment part is detected in a process of making garments, subsequent garment making steps are actuated in response to the detection of the stitching.

U.S. Pat. No. 4,820,912, incorporated herein by reference, provides a method and apparatus utilizing microwaves for authenticating documents, having a random distribution of stainless steel fibers embedded and scattered in a card base member. Microwaves are applied to a large number of metallic wires which are embedded and scattered at random in a document or a card, and a proper digital mark responsive to a response microwave signature is recorded in a suitable region of the document or card according to specific rules. To check the authenticity of the document or card, microwaves are applied to the document or card, and a response microwave signature is collated with the digital mark. The document or card is determined as being authentic when the microwave signature and the mark correspond.

PHYSICAL SECURITY SCHEMES—FILMS AND EMBEDDED FILAMENTS

U.S. Pat. No. 4,157,784, incorporated herein by reference, discloses a document security system that optically reveals erasures or modifications of printed matter.

U.S. Pat. No. 3,391,479, incorporated herein by reference, discloses a card security system that provides a dichroic film covering information on the card.

U.S. Pat. No. 3,880,706, incorporated herein by reference, discloses a document security system provided by a fused polymer net within a paper pulp substrate.

U.S. Pat. No. 4,247,318, incorporated herein by reference, provides a security paper formed from non-woven polyethylene film-fibril sheets.

U.S. Pat. No. 4,186,943, incorporated herein by reference, discloses a banknote or document security system that provides an optically distinctive thin film structure in the body of the banknote or document.

U.S. Pat. No. 4,445,039, incorporated herein by reference, discloses an encoded document security system having a security element with a readable physical characteristic.

U.S. Pat. No. 4,652,015, incorporated herein by reference, discloses security paper for banknotes and currency having a metalized film having fine imprinting thereon.

U.S. Pat. No. 4,552,617, incorporated herein by reference, discloses a document security system provides dissolvable strips of microcarrier material having encoding thereon which persists after the carrier dissolves. U.S. Pat. No. 4,437,935, incorporated herein by reference, discloses a document security system provides a dissolvable carrier web material having encoding thereon which attaches to the paper fibers and persists after the web dissolves.

U.S. Pat. No. 5,393,099, incorporated herein by reference, provides an anticounterfeiting method for currency and the like having embedded micro image security features, such as holograms and diffraction gratings.

ENCRYPTION AND ENCODING SCHEMES

U.S. Pat. No. 5,426,700, incorporated herein by reference, provides a public key/private key system for verification of classes of documents, to verify the information content thereof. U.S. Pat. Nos. 5,420,924, and 5,384,846, incorporated herein by reference, provide secure identification cards bearing an image of the object to be authenticated. U.S. Pat. No. 5,388,158, incorporated herein by reference, provides a method for making a document secure against tampering or alteration.

U.S. Pat. Nos. 5,375,170, 5,263,085, and 4,405,829, incorporated herein by reference, provide encryption and digital signature schemes. U.S. Pat. Nos. 5,600,725, and 5,604,804, incorporated herein by reference, provide public key-private key encryption systems. U.S. Pat. No. 5,166,978, incorporated herein by reference, provides a microcontroller for implementing so-called RSA schemes. A so-called public key/private key encryption protocol, such as available from RSA, Redwood Calif., may be used to label the workpiece with a "digital signature". See, "A Method for Obtaining Digital Signatures and Public Key Cryptosystems" by R. L. Rivest, A. Shamir and L. Adelmann, Communications of ACM 21(2):120–126 (February 1978), expressly incorporated herein by reference. In this case, an encoding party codes the data using an appropriate algorithm, with a so-called private key. To decode the message, one must be in possession of a second code, called a public key because it may be distributed to the public and is associated with the encoding party. Upon use of this public key, the encrypted message is deciphered, and the identity of the encoding party verified. In this scheme, the encoding party need not be informed of the verification procedure. Known variations on this scheme allow private communications between parties or escrowed keys to ensure security of the data except under exceptional authentication procedures. See also, W. Diffie and M. E. Hellman, "New directions in cryptography", IEEE Trans. Information Theory, Vol. IT-22, pp. 644–654, November 1976; R. C. Merkle and M. E. Hellman, "Hiding information and signatures in trapdoor knapsacks", IEEE Trans. Information Theory, Vol. IT-24, pp. 525–530, September 1978; Fiat and Shamir, "How to prove yourself: practical solutions to identification and signature problems", Proc. Crypto 86, pp. 186–194 (August 1986); "DSS: specifications of a digital signature algorithm", National Institute of Standards and Technology, Draft, August 1991; and H. Fell and W. Diffie, "Analysis of a public key approach based on polynomial substitution", Proc. Crypto. (1985), pp. 340–349, expressly incorporated herein by reference.

Another encoding scheme uses a DES-type encryption system, which does not allow decoding of the message by the public, but only by authorized persons in possession of the codes. This therefore requires involvement of the encoding party, who decodes the message and assists in stone authentication.

U.S. Pat. Nos. 5,191,613, 5,163,091, 5,606,609, and 4,981,370, incorporated herein by reference, provide document authentication systems using electronic notary techniques. U.S. Pat. Nos. 5,142,577, 5,073,935, and 4,853,961, incorporated herein by reference, provide digital notary schemes for authenticating electronic documents.

U.S. Pat. No. 4,816,655, incorporated herein by reference, provides a document authentication scheme which employs a public key-private key scheme and which further employs unscrambled information from the document.

U.S. Pat. No. 4,637,051, incorporated herein by reference, provides a system for printing encrypted messages which are difficult to forge or alter.

U.S. Pat. No. 4,630,201, incorporated herein by reference, provides an electronic transaction verification system that employs random number values to encode transaction data.

U.S. Pat. No. 4,463,250, incorporated herein by reference, provides a method for detecting counterfeit codes based on a low density coding scheme and an authentication algorithm.

U.S. Pat. Nos. 5,464,690 and 4,913,858, incorporated herein by reference, relate to certificates having holographic security devices.

See also, U.S. Pat. Nos. 4,150,781; 4,494,381; 4,637,051; 4,864,618; 4,972,475; 4,982,437; 5,075,862; 5,142,577; 5,227,617; 5,283,422; 5,285,382; 5,337,361; 5,337,362; 5,380,047; 5,370,763; 5,243,641; 4,514,085; 4,199,615; 4,059,471; 4,178,404; 4,121,003; 5,422,954; 5,113,445; 4,893,338; 4,995,081; 4,879,747; 4,868,877; 4,853,961; 4,812,965; 4,507,744; and EP 0,328,320, incorporated herein by reference.

Thus, there remains a need for a system and method for controlling, enabling, and directing marking of goods during the manufacturing process and enabling detection/cross-validation of the marks so that the goods are uniquely identified and tracked throughout the stream of commerce. In addition, there remains a need for a method and system for marking such that the markings are not readily reproducible with commonly available devices and so that the markings contain sufficient information for product authentication, identification, and tracking. There also remains a need for an article marking method wherein the marking is particularized for the individual article and therefore preventing an otherwise authentic label from being placed on a different article, and preventing forgery of the label or the associated object.

There further exists a need for improved systems and methods which provide security features for labeling and anticounterfeiting schemes, providing physical security, which is applicable to mass market consumer goods, i.e., a system which is low cost, easy to apply, have secure hardware designs, and are easily authenticated by both physical security and identification codes. Heretofore, such systems have had various shortcomings.

SUMMARY AND OBJECTS OF THE INVENTION

The present invention therefore relates to a system which provides authentication of an object, by providing at least two levels of security, a physical level, provided by an observable feature an authentication certificate, and an information level, provided by encoding a unique characteristic of the authentication certificate (such as the observable feature) and/or object to be authenticated in a marking on the certificate.

To provide a level of security which discourages translocation (removal from authentic goods and reassociation with counterfeit goods) of labels, a characteristic of the labeled object may also be encoded on the authentication certificate (label) in encrypted format. Thus, the label is made specific for the object. In this case, the particular characteristic of the object need not be made public, for example being selected from a group of potential characteristics. In this case, the authentication at this level is not directly performed by untrusted personnel, or is fully automated in a secure environment. For example, a particular random or non-deterministic pattern or relation of the object, preferably involving the relation of the label to the object, may be measured as the characteristic. The differing classes of objects may be limited, for example eight or more different and randomly distributed configurations. The label is encoded with the class of object, making mass duplication difficult, since the class must be determined and then properly encoded in order to authenticate. The required degree of certainty desired will determine the attribute(s) of the object and the method of measurement thereof, bearing in mind that the attribute must be reliably measured in the field for authentication; conversely, selection of the attribute(s) and methods of measurement will affect the reliability and robustness of authentication thereon. Obviously, multiple attributes may also be encoded for additional security.

As used herein, the phrase "irregularly spaced" includes randomly spaced, e.g., having no imposed pattern and subject to statistical variations, and pseudorandomly spaced, e.g., spaced in a pattern determined by a complex formula such that, within the scope of common analysis, no repetition is observed or deciphering of the complex formula is possible.

Thus, in order to address the secondary problem of reassociation of an authentic certificate with counterfeit goods, a unique or random attribute of the goods may be measured, and stored in a manner associated with the item or imprinted on the certificate. Therefore, in authenticating the certificate, an analysis of the original goods in addition to the label must also be made. For any characteristic, the population may have a limited number of classes, given the need to provide a measurement reliability tolerance to allow manufacturing, and measurement tolerances and allow for slight changes in the goods over time yet still be classed as authentic. Therefore, the encoding of characteristics of both the authenticity certificate and object, where appropriate, are provided with predetermined precision, to provide reliable authentication with few errors. In one embodiment, the characteristic of the object to be measured is itself securely encoded on the authentication certificate, so that until decoding it is not known which characteristic is to be measured.

The imprint of the coding may be formed in known manner, for example, ink jet, laser printer, mechanical imprinting, or the like. For financial instruments, such as checks, the encoded imprint is advantageously printed, as a magnetic ink coded recording (MICR), to be compatible with existing check reading apparatus. In the case of bank checks, the authentication is advantageously used in conjunction with a check truncation system, wherein authenticated checks are verified, imaged, and then the physical check destroyed and the image processed and used to clear the funds. See, e.g., U.S. Pat. Nos. 5,668,897, and 5,748,780, incorporated herein by reference.

In many instances, such as banknotes and checks, the authentication certificate itself is the item of value, and no external goods are associated; however, these certificates may have individual markings (e.g., the specifics of a check) or serial numbers. In this case, these markings may be encoded into the code, to prevent tampering or forgery.

In contrast to prior methods, according to the present invention, the banknotes and checks are self-authenticating, i.e., they contain sufficient information and sufficient security of the information encoded to provide a high likelihood of authenticity. While an index may be provided for reference to a remote database, in a preferred embodiment reference to this remote database is not required for point of presentation authentication.

The present invention thus encompasses an authentication device which may be used to authenticate a certificate by relatively unspecialized users, to provide a validation of the certificate (e.g., label, banknote, check, woven item, etc.) while maintaining the security of the scheme. Thus, for example, security features may be provided to prevent use of the authentication device to "break" the encoding scheme. Therefore, a number of characteristics may be desirable for the authentication device: (1) small size, for example less than 0.05 cubic meter, preferably less than 0.01 cubic meter; (2) low power consumption, for example less than about 100 Watts average, more preferably less than about 1 Watt quiescent, 20 Watts peak power draw from a power supply; (3) physical security against disassembly and reverse engineering; (4) electronic security against reverse engineering or code readout; (5) operational security against repeated attempts to verify counterfeit certificates; (6) time-out authorization, requiring periodic reauthorization to remain operational; (7) audit trail capability, to track users and particular usage; (8) adaptive capabilities to compensate for changes over time, such as dirt, defective pixels, wear, etc.; (9) non-predictable authentication schemes, for example selectively analyzing different sub-portions of the certificate in great detail for normal analyses; (10) high security encryption algorithms and optionally support for multiple redundant and independent encryption schemes.

The label or certificate may be provided with codes having a multiplicity of levels. Thus, even if a first level code is broken, one or more backup codes may then be employed. The advantage of this system over a single level complex code is that the complexity of the detection devices used in the first instance may be reduced, and the nature and even existence of the higher level codes need not be revealed until necessary.

In order to prevent mass duplication of labels or certificates, it is preferable to encrypt and print a code representing varying characteristic of the label or certificate. In verifying the code, the associated characteristics must correspond. Such a system adds markedly to the complexity of any counterfeiting scheme, while still allowing labeling or goods and production of certificates to proceed. In a simpler system, the mere repetition of supposedly random or pseudorandom codes is detected, indicating simple copying.

In order to prevent the replacement of an authentic label on a different item, a unique, random or quasi-unique characteristic of the item is encoded on the label. In this way, relocation of the label to other goods may be detected.

In order to provide robustness against encryption cracking, a plurality of encoding schemes may be employed, for example to avoid complete system failure if one of the encoding schemes is "broken". For example, three different codes may be provided on the certificate, employing three different algorithms, and potentially based on three different sets of criteria.

Preferably, the encoding and authentication employ a system which prevents tampering, reverse engineering or massive interrogation, which might lead to a determination of the underlying algorithm and/or the generation of valid codes for counterfeit goods. Thus, for example, a secure central server may provide authentication services, over secure communications channels.

Self-authentication may be based on a public test algorithm, however, unless this algorithm is highly secure, this is not preferred for high security applications, but may be acceptable in moderate security applications. The risk is that if the private (secret) encryption key is discovered or released, the usefulness of the encoding is lost, and further, until the pool of authentic goods bearing the broken encoding is depleted, counterfeiters may continue undetected. Self-authentication schemes are subject to sequential cracking attempts until the code is broken; once an authentication code (private key) is discovered, it may be used repeatedly.

It is noted that the imprinted code on the certificate need not be visible and/or comprehensible, but rather may itself be a security feature. Thus, special inks, printing technologies, or information storage schemes may be employed.

For example, intentional or "pseudorandom" irregularities (seemingly random, but carrying information in a data pattern) may be imposed on the marking, in order to encode additional information on top of an explicit marking pattern. Such irregularities in the marking process may include dot position, intensity and/or size modulation, and varying degrees of overlap of dots. Without knowledge of the encoding pattern, the positional irregularities will appear as random jitter and the intensity irregularities will appear to be random. Because a pseudorandom pattern is superimposed on a random noise pattern, it may be desirable to differentially encode the pseudorandom noise with respect to an actual encoding position or intensity of previously formed markings, with forward and/or backward error correcting codes. Thus, by using feedback of the actual marking pattern rather than the theoretical pattern, the amplitude of the pseudorandom signal may be reduced closer to the actual noise amplitude while allowing reliable information retrieval. By reducing the pseudorandom signal levels and modulating the pseudorandom signal on the actual noise, it becomes more difficult to duplicate the markings, since the noise itself is random and near or beyond the marking system precision, and more difficult to detect the code without a priori knowledge of the encoding scheme.

While alphanumeric codes and other readily visible codes may be read by eye, subtle encoding methods may require specialized equipment for reading. Therefore, another aspect of the invention provides an automated system for reading codes inscribed on a certificate. The image analysis capability will generally be tuned or adapted for the types of coding employed, reducing the analysis to relevant details of the marking. Therefore, where a pseudorandom code appears in the marking pattern, the individual mark locations and their interrelations are analyzed.

One embodiment of the present invention thus solves the above noted problems and overcomes suboptimizations inherent in the prior art by providing an authentication mechanism utilizing fluorescent dichroic fibers. The fibers are randomly and non-deterministically embedded into or form a part of a substrate. This means that by studying any one substrate, the pattern in any other substrate, and therefore a code representing that pattern, is not made apparent. This pattern may be stored in a database with an identification of the substrate, indexing the stored characteristics of the substrate, and/or encoded on the substrate with an imprinted encrypted code.

The preferred system incorporates a sheet of material, the authentication certificate or label, impregnated with dichroic fibers containing a fluorescent dye, that combines to form a high security system to thwart counterfeiting in a wide range of applications. Dichroic polymer fibers may also form part of the object to be authenticated. These fibers are relatively difficult to produce, and their embedding into paper or woven goods requires special equipment. Further, these fibers are observable with the naked eye, discouraging low sophistication attempted counterfeiting of certificates without this feature. This system allows for instant field verification of labels while maintaining a high level of security against counterfeiting by making the reverse engineering process extremely difficult and expensive. No two labels are ever alike, yet they can be produced very economically. In order to determine if the imprinted code corresponds to the certificate itself, the fiber pattern, which is completely random, is illuminated by a light and read by a scanner. The resulting pattern is then compared to the encoded pattern to determine authenticity.

According to a preferred embodiment, the pattern on the certificate is represented as an image projected on a surface, with the surface not necessary being constrained as a planar sheet. Therefore, relative deformations of the certificate pattern may be resolved through mathematical analysis using known techniques. The relative deformations, as well as any other deviations from the encoded patterns, which for example may represent lost or obscured fibers, noise, environmental contamination with interfering substances, errors or interference in the original encoding process, etc., are then used to determine a likelihood that the certificate itself corresponds to the originally encoded certificate. Thus, the determined authenticity is associated with a reliability thereof, based on stochastic variations in the properties of the authentication certificate and stochastic variations in the generation of the associated secure code. A threshold may then be applied to define an acceptable error rate (false positive and false negative) in the authentication process.

To produce an informational level of security which allows authentication without accessing a central information repository (database), the location or particular characteristics of the dichroic fibers, which are random or unique, are determined, and used to generate an encrypted code, wherein the encryption algorithm key (or private key) is maintained in secrecy. Therefore, the code must match the dichroic fiber location or characteristics for authentication of the certificate. Since the dichroic properties provide a characteristic which existing duplication systems cannot control, the certificate with encoding is very difficult to undetectably duplicate.

In one embodiment, the object itself is labeled with one or more dichroic fibers, whose location, orientation, or characteristics are encoded on the certificate. For example, an apparatus may sew a small number of dichroic fibers into the garment at unique or semi-unique positions. These fibers may be nearly invisible, yet are easily detectable by specialized detection apparatus; alternately, the dichroic fibers may be visibly presented, such as to form a logo. Such a logo may present distinctive visible features, allowing lay persons to authenticate the object, at least on this level of security.

According to another embodiment of the invention, fibers may be provided with spatial variation in patterns, such as dichroism, color, coating thickness, or the like, providing additional, and difficult to reproduce, degrees of freedom into the security scheme. These variations may be random or relatively unique, and, for example, may include enough information content to uniquely identify the object. For example, the polarization angle along the length of a dichroic fiber may be controlled by altering a "stretch" of the fiber during fabrication, or post modification, for example by laser diode heating to form a polarization angle pattern on the fiber which varies over distance. The pattern may be truly random, or pseudorandom, with an arbitrarily large repetition interval or have a regular pattern. In any case, as the fiber (either on the object or the certificate itself) is being encoded on an authentication certificate, the fiber is analyzed for the particular property, and this property and possible the relationship to other properties, used, in part, to encode the certificate. It is noted that the replication of such patterns on fibers is particularly difficult, making this a useful additional security feature beyond the mere presence of dichroic fibers.

As stated above, the yarn or fiber may be imparted with a varying dichroic characteristic by selectively dying or bleaching a fiber or by inducing dichroism by selectively stretching portions of the fiber. In one embodiment, a beam of light, e.g., a laser, may be used to excite and selectively bleach dye within the fiber, providing a system for "writing" information to the fiber. In another embodiment, the fiber or substrate is coated with a magneto-optic recording layer which is selectively heated above the Curie temperature and selectively subjected to a magnetic field to induce a measurable light polarization effect.

The fiber may be modified during or in conjunction with the manufacturing process, or at a point of use. When a laser is used to modify the fiber, it heat the fiber, thereby altering the alignment of molecules, and/or it may bleach the dye in the fiber, thus reducing the concentration of the fluorescent species. The laser may be driven in a regular pattern, a random pattern, a pseudorandom pattern, or in a chaotic state of operation. In the latter case, the inherent instability of the laser is employed. It is noted that, according to the method of VanWiggeren and Roy, "Communication with Chaotic Lasers", Science, 279:1198–1200 (Feb. 20, 1998), an information signal may be modulated onto the laser output and masked by the chaotic variations, providing an encrypted data signal. By replicating the state of a receiving system laser having similar characteristics, including parameters of operation and starting state, it is possible to decode the data from the output signal. See Also, Gauthier, D. J., "Chaos Has Come Again", Science, 279:1156–1157 (Feb. 20, 1998). Thus, for example, a serial number or other coding may be imparted to the fiber which would be difficult to detect or duplicate without knowledge of the encoding system parameters, providing an additional level of security.

Since the dichroism of the fiber is related to the dye molecules, it is possible to include a plurality of dye types within the fiber. Each dye, having a distinct absorption and fluorescence spectrum, is separately detectable. Further, the respective dye concentrations may be varied during the manufacturing process, or later selectively bleached by, for example, a laser at an absorption maximum wavelength of a particular dye species. Thus, for example, using commonly available three-color image detectors, three separate dyes may be detected, providing additional degrees of freedom for an authentication scheme. It is noted that, while dichroic fibers are preferred, it is not necessary for each dye to be associated with a dichroic property or a distinct dichroic property. Thus, the dichroism, fluorescence, and absorption and/or transmission characteristics may potentially be distinct characteristics of the fiber.

In another embodiment of the invention, microspheres are provided having dichroic properties. In this case, the data map includes the position and polarization axis orientation of the microspheres, which it should be understood is a three dimensional vector in the case of a linear fluorescent emission axis from a dye and a two dimensional vector in the case of a radially symmetric fluorescent emission from a dye. Advantageously, these microspheres may be applied to an object using a printing process, for example lithography, ink jet printing, specialized laser printing (with care taken to avoid undesired changes to the dichroism in the fuser), and the like.

According to one embodiment of the invention, dichroic fibers are formed of nylon having a fluorescent dye mixed into the polymer matrix. During the forming process, the fiber is stretched, which tends to align the molecules along the stretch axis. This anisotropic characteristic lead to dichroism, which differentially affects light of varying polarization axis. Therefore, due to this differential effect, the fiber will have a light polarization rotation, especially at wavelengths corresponding to the absorption and/or emission of the fluorescent dye. It is noted that the nylon itself may also be dichroic, but typically the effect is not easily observed at visible or other easily measured wavelengths; on the other hand, the dye is specifically selected to have useful optic interactions and to obtain a high degree of anisotropism under the process conditions.

The preferred nylon dichroic fibers allow for a number of identifying variations, for example the amount or type of dye in the fiber, optical, heat, physical or chemical (e.g., chemical or photo-bleaching, heating, stretching or fiber deformation) modifications of the fiber during or after fabrication, or after placement in an identifying substrate. As can be seen, a number of degrees of freedom are possible, providing a number of strategies for detection and making duplication difficult. The preferred variations are the amount of dye and physical stretch, both of which can be controlled, early in the manufacturing process of the fibers. Preferably, these two variations are provided over relatively short distances, for example millimeter ranges or smaller, providing a relatively high information-carrying capability, and this allowing relatively short lengths of fiber to provide sufficient information to identify the substrate. Alternately, a modulated laser may be used to modify the fiber, to alter the dye and/or molecular chain organization. Such laser coding can be applied on a physical scale of microns, and can be controlled to tight tolerances. Microscopic scale variations; however, may be occluded during the labeling process, and shifts may occur in the fiber with respect to occluding elements; therefore the entire system designed to read such microscopic variations must be robust and provide statistical thresholds to avoid misidentification and/or misverification.

Fibers may also be used which are selectively sensitive to environmental conditions, such as temperature, humidity, gasses, and the like, so that a change in characteristics, e.g., optical characteristics, is measured based on a change in such conditions.

The label formed with the fibers may be identified based on an identifying location of the fibers, and/or identifying characteristics of the fibers. The fibers may be randomly dispersed in a carrier material, at such density to allow reliable identification, but without obscuring identifying features. For example, the fibers may be mixed into pulp to form paper, such as in the process used for U.S. currency. The locations of the fibers are then determined, allowing a correlation between the fiber locations and the identity of the substrate.

Preferably, the use of fibers is kept in the low acceptable range, in order to control and minimize the public release of fiber material and labels. If large quantities of the fiber material or labels were made publicly available, then the risk of reuse of these fibers or reuse of labels increases, thus undermining the mere presence of the fibers as a security measure.

According to another feature of the invention, the fibers may include a component that irreversibly varies over time or environmental exposure, making long-term persistence of fibers in the market more difficult. Such a component is, for example, a dye or additive that degrades with ambient light or oxygen exposure under normal conditions, or even is the result of a progressive chemical reaction within the formed fibers. Of course, this degradation limits the ability to inventory and ship normal goods that are intended to be deemed authentic after a long period of time, and compels expedited authentication of suspect goods. Thus, selection and implementation of this procedure is limited to appropriate conditions.

Preferably, the encoding characteristics of the fibers may be determined automatically at relatively high speed, allowing the both the original labeling and authentication process to proceed efficiently, without highly skilled operators or trusted personnel.

Where the fibers are incorporated into a label linked to an object, the preferred image scanner is a two-dimensional image scanner, whereas for banknotes, certificates and checks, a line scan image sensor is preferred.

In another embodiment of the invention, a woven label is formed including security threads, e.g., dichroic fibers, and/or various encoded fibers as a part of its structure. Dichroic fibers may also be interspersed with nearly identical fibers having low dichroism. The special fibers are provided at sufficient density to provide the desired level of security (defining a minimal information content), and limited in maximum density to avoid interference in detection of the particular property of interest. The label may include as little as a single short length of fiber, or may even be formed completely of encoded or special fibers. This label may be itself printed with a security or identification code, or such a code printed on another substrate associated with the object, such as a hang-tag or other label.

The dichroic fibers may thus be incorporated into a product label. For example, many garments have woven labels. The dichroic fiber may therefore be incorporated into the weaving process to form an integral part of the label, using spools of dichroic fiber in the weaving or sewing process. In order to provide increased security over the mere presence of dichroic fibers, the fibers, which are, for example, nylon fibers having a fluorescent dye and a dichroic characteristic, are non-uniformly dyed and/or dichroic along its length. This non-uniformity may be integral to the nylon fiber forming process, or a post modification of a formed fiber. The dichroism may be altered by mechanically stretching the fiber during a manufacturing step, to alter the relative alignment of molecules, altering the polarization axis, resulting in dichroism. These manufacturing variations may be truly random, regular, or pseudorandom, i.e., seemingly random, but generated by a known algorithm. A relatively small number of dichroic fibers may be used, carrying sufficient information to uniquely or quasi-uniquely identify the label. However, the entire woven label may be formed of encoded or mixed coded and unencoded fibers, or any portion thereof.

In the case of clothing or woven goods, dichroic fibers may form a part of the goods themselves, and indeed may be woven into a logo or marking. For example, in a garment, a particular stitching pattern or relation of seam stitching to underlying fabric weave may be the characteristic. The class of garments may have, for example, 10 different and randomly distributed configurations, based on the random alignment of the stitching needle and the fabric weave. A relationship of a stitching pattern with the threads of the cloth at a particular portion of the garment will typically be random, yet stable. For other products, a dimension or tolerance, color or dye distribution, invisible marking distribution or the like, may be measured.

In order to detect the dichroism, one embodiment of the invention provides for the use of two light sources having different characteristics, such as wavelength or polarization angle, to illuminate the dichroic fibers in sequence for greater precision and security. Alternately, a single light source may be sequentially filtered.

The present invention thus encompasses a system that reads a unique characteristic of a label or certificate and imprints thereon an encrypted message defining the unique characteristic, making the label or certificate self-authenticating. Optionally, a unique or identifying characteristic of an object associated with a label or certificate may be further ascertained and printed as an encrypted message on the label, uniquely associating the label or certificate with the object. Preferably, the characteristic of the object is a random tolerance or highly variable aspect, which is difficult to recreate, yet which is comparatively stable over time so that measurements are relatively repeatable. Where the characteristic changes over time, preferably these changes are predictable or provide identification, such as of the date of manufacture. As stated above, the authentication algorithm may compensate or take into consideration "normal" changes or deviations, thus minimizing rechecks or manual examination of the certificates or labels.

The labeling system therefore includes a reader, for reading the unique characteristics of the label or certificate, such as a polarization sensitive imaging device for reading a distribution of dichroic fibers embedded in paper, and optionally a device which measures an identifying characteristic of the object to be labeled, such as a dimension, tolerance, color, sewing or thread pattern, etc. This information is then encrypted using an algorithm, to produce an encrypted message, which is then printed in the label, for example using a dye sublimation or ink jet printer. The encryption is preferably a multilevel system, for example including a 40-bit algorithm, a 56-bit algorithm, a 128 bit elliptic algorithm, and a 1024 bit algorithm. Each message level is preferably printed separately on the label, for example, the 40 bit encrypted message as an alphanumeric string, the 56 bit encrypted message as a binary or bar code, the 128 bit elliptic encrypted message as a two-dimensional matrix code and the 1024 bit algorithm as a pseudorandom placement of dots of one or more colors on the face of the label. Alternately, the higher level messages may be encrypted by the lower level algorithms, providing a multiple encryption system. Preferably, each encrypted message corresponds to successively more detailed information about the label and/or the object, optionally with redundant encoding or potentially without any overlap of encoded information. This system allows readers to be placed in the field to be successively replaced or upgraded over time with readers that decode the more complex codes. By limiting use of the more complex codes, and release of corresponding code readers, until needed, the risk of premature breaking these codes is reduced. In addition, the use of codes of varying complexity allows international use even where export or use restrictions are in place of the reader devices.

The invention also provides a reader adapted to read the characteristic of the label corresponding to the encoded characteristic, optionally sense or input the characteristic of the associated object, and either manually or automatically verifies the printed code on the label. If the code verifies, the label and/or object are authentic.

Preferably, both the marking system and the reader have a secure memory for the algorithm(s), which is lost in event of physical tampering with the devices. Further, the devices preferably have a failsafe mode that erases the algorithm(s) in case of significant unrecoverable errors. Finally, the systems preferably include safeguards against trivial marking or continuous interrogation, while allowing high throughput or marking and checking of objects and labels.

Since the algorithm memory within the reader may be fragile, a central database or server may be provided to reprogram the unit in case of data loss, after the cause of loss is investigated. Any such transmission is preferably over secure channels, for example 128-bit encryption or so-called secure socket layer (SSL) through a TCP/IP communication protocol. Each reader and marking system preferably has a unique identification number and set of encryption keys for any communication with the central system, and a marking placed on the label indicative of the marking conditions, for example marking system ID, date, location, marking serial number, and the like.

Labels can be affixed to any number of consumer and high security application including, for example, CDs/software, designer clothes, wine, cosmetics, seals, video tapes, floppy disks, perfume, electronics, currency, cassettes, books, records, documents, and financial instruments.

It is therefore an object of the invention to provide an authentication system comprising a medium having a plurality elements, the elements being distinctive, detectable and irregular, each element being characterized by a determinable attribute distinct from a two-dimensional coordinate representation of simple optical absorption or simple optical reflection intensity; detector, detecting an attribute and position of the plurality of elements, with respect to a positional reference; a processor for generating an encrypted message including at least a portion of the attribute and position of the plurality of elements; and a recording system for recording the encrypted message in physical association with the medium. These simple optical absorption and simple optical reflection two-dimensional coordinate distributions are referred to herein as chroma-luminance maps (color and/or intensity two-dimensional coordinate distributions), and are optical polarization independent. Normal scanners are not capable of detecting optical polarization angle, and thus the attribute is difficult to detect and replicate without specialized equipment.

It is also an object of the invention to provide an authentication system comprising a media having a plurality of distinctive detectable elements thereon or therein, each element comprising at least one determinable degree of freedom distinct from color, intensity and position (optical absorption, optical reflection and two-dimensional position); a scanner for defining a positional reference and detecting the at least one degree of freedom of the plurality of detectable elements, and a position thereof with respect to the positional reference; a processor for encrypting a message including the detected at least one degree of freedom and position of the plurality of detectable elements; and a recording system for recording the encrypted message on the media. The media preferably comprises fiber exhibiting dichroism and the at least one degree of freedom comprises optical polarization angle, dye intensity variation over length, or optical polarization angle variation over length. The distinctive detectable elements are arranged irregularly, meaning randomly or pseudorandomly, and thus the positions of the elements provide useful information for distinguishing different media.

As used herein, the term distinctive refers to the fact that the detectable elements are usually recognizable from background or debris, and therefore detection thereof is relatively reliable.

It is also an object of the invention to provide an authentication system wherein a processor receives a parameter relating to an object associated with the media, and encrypts the message based on the detected at least one degree of freedom, position of the plurality of detectable elements and the parameter.

It is also an object according to the invention to provide a fault tolerant encoding scheme providing statistical correlation between a code derived from imaging an object at a first time and an image derived from an object at a second time, wherein the statistical correlation distinguishes authentic from counterfeit with a specified degree of certainty or confidence, in the presence of noise, physical distortion, environmental changes and conditions, and over time.

It is a further object of the invention to provide a system which provides vector mapping of the distinctive detectable elements on the medium, allowing scoring of a correspondence of an encrypted vector mapping and a measured vector mapping. In this way, the entire image of the media need not be recorded as an encrypted message in order to authenticate the media with allowance for measurement tolerance and variations in the configuration of the medium over time, while allowing sufficient degrees of freedom to reliably authenticate the medium.

As employed herein, a media is provided having a plurality of distinctive irregular elements. The elements therefore have an arrangement or presentation that does not follow an easily decipherable pattern. Each element is further characterized by a determinable attribute distinct from a two-dimensional coordinate representation of simple optical absorption or simple optical reflection. Thus, the elements do not represent a simple, planar intensity reflection or absorption intensity pattern.

It should be understood that in other embodiments, other or additional anti-copying techniques and random or unique attributes of the certificate (label) and/or object may be exploited to provide security features.

These and other objects will become apparent. For a fuller understanding of the present invention, reference should now be made to the following detailed description of the preferred embodiments of the invention as illustrated in the accompanying drawings.

BRIEF DESCRIPTION OF THE DRAWINGS

The invention will now be described with respect to the drawings of the Figures, in which.

DETAILED DESCRIPTION OF THE PREFERRED EMBODIMENTS

Figure 1:
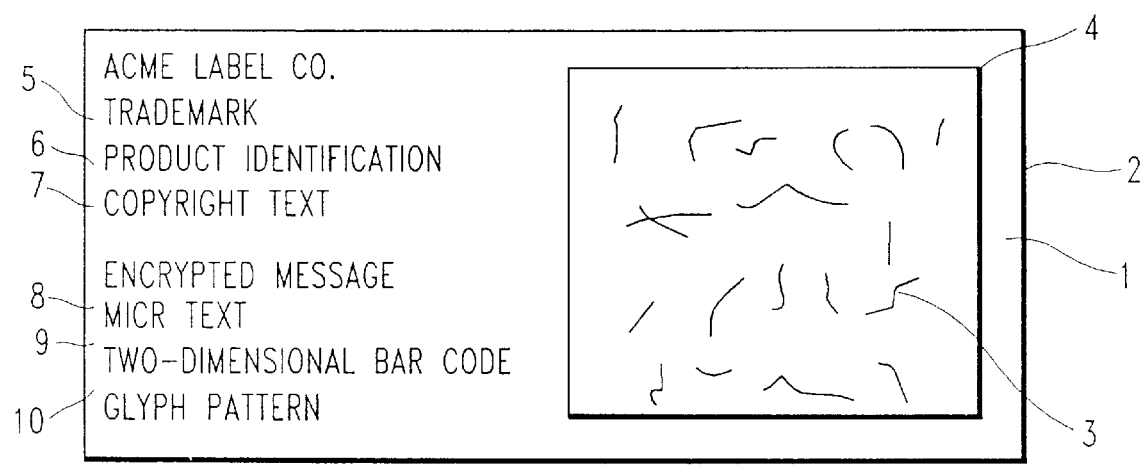
FIG. 1 is front view of an authentication certificate according to the present invention.

The detailed preferred embodiments of the invention will now be described with respect to the drawings. Like features of the drawings are indicated with the same reference numerals.

In order to provide improved authentication and avoidance of counterfeiting the present invention utilizes fluorescent dichroic indicators. Materials that are dichroic may have different absorption coefficients for light (i.e., electromagnetic energy, typically ranging from infrared to ultraviolet wavelengths) polarized in different directions. When the energy of the incident photon (polarization) corresponds to the absorption transition of the molecule, the interaction between the absorbing dipole and the incident photon is largest and high absorption of incident photons is observed. This energy is, for example, re-emitted by a fluorescent molecule with the plane of polarization of the emitted photons aligned with the emitting dipole of the fluorescent molecule. Most molecules have the absorbing and emitting dipole approximately collinear. When the polarization of the exciting light is collinear with the absorption dipole, the fluorescent emission will be highest. Light polarized normal to the absorbing dipole, on the other hand, is not absorbed to a great extent, hence, the resulting emitted intensity from this absorption is low. Where the light source is not polarized, the dichroism of each fiber will result in respective polarized reflection, transmission, and emission.

According to a preferred embodiment, the authentication indicator is a dichroic material. Preferably, the dichroic material will exhibit a high degree of dichroism. It is not important, however, in what form the dichroic materials are introduced into the media being authenticated. For example, there may be situation where authentication is facilitated by using dichroic indicators in the form of ribbons, rectangles, pyramids, spheres, etc. As long as the indicator's dichroism is reasonably preserved during formation of the article (i.e., incorporation of the dichroic indicators with the article), the shape/form of the dichroic indicator is not important. A preferred form for the dichroic indicator is a fiber. Fibers may advantageously be used to incorporate the desired dichroic behavior into the article since fibers may be incorporated within many processes without detriment to the process (e.g., paper making, weaving, sewing) or dichroic fiber. The fibers may have widely varying cross-sections and lengths. Essentially the only requirement is that the configuration of the fiber not disrupt the underlying manufacturing process (e.g., with aerosol applications the fibers must be sufficiently small to be sprayed). Where otherwise feasible, the dichroic fibers are somewhat elongated since elongated fibers are easier to identify within a matrix of material and can potentially provide more data that shorter fibers (e.g., since different points along the length of a long fiber may be more or less obscured by paper fibers, be closer to or further from the paper surface, etc., and hence, exhibit more or less dichroism). Finally, in some circumstances it may be possible to use fibers of uniform lengths to provide easily verifiable data points—i.e., when inquiring whether a marked article is authentic, one can quickly see if fibers of appropriate lengths are present. Synthetic polymer materials are preferred for the fiber material, e.g., Nylon 6,6. A wide variety of acceptable indicator materials are available at very low cost. For example, polyesters, polyamides, poly(amide-imides) and poly(ester-imides) can be made birefringent. Examples of polymers used in preparing the stretched films having a positive intrinsic birefringence include polycarbonates, polyarylates, polyethylene terephthalate, polyether sulfone, polyphenylene sulfide, polyphenylene oxide, polyallyl sulfone, polyamide-imides, polyimides, polyolefins, polyvinyl chloride, cellulose and polyarylates and polyesters. Examples of negative intrinsic birefringence stretched films include styrene polymers, acrylic ester polymers, methacrylic ester polymers, acrylonitrile polymers, and methacrylonitrile polymers.

Suitable dyes, where necessary or desired, include naphthalimides, coumarins, xanthenes, thioxanthines, naphtholactones, azlactones, methines, oxazines, and thiazines. Rhodols, Rhodamines (See, U.S. Pat. No. 5,227,487, and U.S. Pat. No. 5,442,045), fluoresceins, and flavines are preferred for visible fluorescence. In using dyes, it should be apparent that instead of employing a single dye or modulating the content of a single dye, a plurality of distinct dyes may be added to the fiber matrix, potentially providing distinct and relatively orthogonal coding schemes. For example, Molecular Probes' Alexa dye series includes five fluorescent dyes, typically used to prepare bioconjugates. The absorption spectra of these five spectrally distinct sulfonated rhodamine derivatives—Alexa 488, Alexa 532, Alexa 546, Alexa 568 and Alexa 594 dyes—match the principal output wavelengths of common excitation sources, thus allowing multicolor coding. Of course, various other dyes or compatible sets of dyes may be employed.

Fluorescent resonant energy transfer (FRET) techniques may also be used to label fibers and detect labeling. It is noted that dichroism is not necessary, especially where a complex optical effect, such as fluorescence or FRET is present. Again, by combining techniques, more efficient coding and greater difficulty in counterfeiting fibers is provided.

The dichroic agent can be brought into association with the indicator in a variety of ways. In order to maximize the dichroism, the dichroic agents (e.g., molecules of dye) are aligned maximally; non-dichroism is achieved by a random distribution of dye molecules. Typically, the dye alignment is achieved by a stretching of the polymer matrix during manufacture, which alters an anisotropy and alignment of polymer chains. The dye is interspersed or linked to the chains, and thus is aligned simultaneously. If the fiber is selectively stretched, or selectively annealed after stretching, spatial variations in dichroism will be apparent. The dye may also be bleached, e.g., photobleached, in a secondary process. Since many dyes have a narrow band absorption, such dyes may be selectively bleached, allowing independent control over spatial dye concentration. Heating, or other annealing processes, are typically not selective, and alter the crystalline structure of the entire portion of the fiber. Such selective heating is possible, for example, with infrared laser diodes or even infrared LEDs.

Preferably, when simple fibers are used as the indicator, the dichroic marking material is aligned along the length of the fiber. In this way the fibers will have very different emission spectra (i.e., with respect to intensity) when excited with light polarized parallel versus perpendicular to the fiber axis, assuming the absorption dipole is along the fiber axis. In general, the absorption dipole of the fluorescent marking molecule will not be perfectly aligned with the fiber axis. This is permissible, but it is preferred that the absorption dipole is nearly parallel or orthogonal to the fiber axis.

Where more complex fibers are employed, preferably the transitions involve polarization rotation between extremes. For example, the fibers may be "squished" along 90 degree-displaced axes along its length. Other techniques may be used to selectively orient the molecules in the fiber, for example using magneto-optic recording techniques.

It is also noted that, where the label itself is formed of dichroic fibers, a pattern may be formed on the fibers by photobleaching or annealing, using light or heat, respectively, for example from a laser. Thus, the absence of dichroism may then be determinative of a pattern thereon. Likewise, in a paper label with embedded dichroic fibers, a code may be provided by selectively bleaching or heating fibers within the label to alter their photon absorption or dichroism, respectively.

The marking material (e.g., a fluorescent dye) may be associated with the indicator material (e.g., fibers) during formation (i.e., the marking material may be incorporated within the indicator itself), or the marking material may be added to the indicator after formation of the indicator. For example, when fibers are used as the indicators and luminescent dye is used as the marking material a preferred method of assuring maximal dichroism (i.e., maximum coalignment of dye molecules) is to melt blend the fibers and dye and then stretch the fiber. With other fiber/marking dye combinations, it may be possible to achieve satisfactory dichroism without a stretching step—e.g., by dipping the fiber in a container of dye.

The preferred dyes in the present invention are luminescent (i.e., fluorescent or phosphorescent). More preferably, fluorescent dyes are utilized as the marking material. Phosphorescent marking materials may also be used, however. The appropriate dye for use in a particular application will depend upon the specifics of the situation. In general, most preferably a fluorescent dye is selected so that the dye's dichroism is maximized at the intended detector wavelength. The marking dye may be tailored to quite specific applications. For example, a dye that emits in the infrared portion of the spectrum may be used to create an authentication signature that is invisible to the eye yet easily detected with appropriate instrumentation.

The fluorescence signal is preferably provided by a fluorescent dye or pigment doped into the fiber polymer matrix, having a long major axis to align with the polymer chains of the fiber during the drawing process. Known dyes may be used, for example organic fluorescent dyes that have absorption and emission in the infrared to near-ultraviolet range. These dyes are also known for a variety of other uses, such as fluorescence microscopy, chemical detection and tagging, physical photon capture applications, and the like. A fluorescent dye or pigment must also be sufficiently stable, thermally, to withstand the fiber production process as well as uncontrolled environmental exposure. The required/preferred concentrations of dye track those utilized in fiber technology generally—i.e., no special processing is required to combine the indicator and marking materials—except for perhaps an added process step to coalign the dye molecules within/along the indicator fibers as discussed above.

Method

The indicator and marking materials of the present invention provide an extremely reliable method for authenticating media (e.g., paper, plastic, etc.). After appropriate fiber polymer matrix and dye materials have been selected for a particular application, the materials are combined (e.g., a fluorescent dichroic fiber is assembled). Thereafter, the authenticating/indicator material may be incorporated into various manufacturing processes without adversely affecting the process, the finished product, or the authenticating material. For example, fluorescent dichroic fibers may be incorporated into papermaking processes, as fibers within the pulp matrix or applied to the surface of the paper, and indeed, the substrate need not be paper. The marking materials may be incorporated into a vast variety of other manufacturing processes—e.g., laminated or otherwise incorporated into plastic products; incorporated into aerosol marking sprays, etc.

As discussed above, the fluorescent dichroic fibers can be used to provide several levels of increasing authentication/counterfeiting-detection. For example, if the paper containing fluorescent dichroic fibers is used to print labels, a first level of authentication is provided by checking that the label contains fluorescent fibers. The next level of authentication may comprise ascertaining whether the fluorescent fibers are dichroic. The next level ascertains whether the pattern of fibers matches an encoded or stored pattern. The final level ascertains whether an attribute of the associated object corresponds to a code on the label.

As shown in FIG. 1, an authentication certificate 1 is provided as a product label, The certificate, in this case, is a sheet of non-woven material such as paper or the like, having embedded therein during the manufacturing process dichroic fibers 3, on a random basis. The authentication certificate 1 may also include other features, such as a trademark 5, product identification 6, copyright text 7 (provided to aid in obtaining a legal remedy in the case of simply copying), MICR text 8 (to allow automated reading by means of an MICR reader of a limited amount of information), a two-dimensional bar code 9 and a glyph pattern 10. Each of the codes (MICR text 8, bar code 9 and glyph pattern 10) may include an encrypted message defining a spatial relation between the dichroic fibers 3 and a reference position 4, which is in this case a printed rectangular box. It is noted that the dicroic fibers 3 need not be circumscribed by a box. and may have any relatively fixed relation to the positional reference. The positional reference 4 may also be defined by a dichroic fiber within the authentication certificate 1.

To duplicate labels containing the fluorescent dichroic fibers, a counterfeiter would need to, among other things: duplicate the fluorescent dye used (to produce the same emission behavior at the selected detector wavelength); use fibers of the same general length and shape; and produce counterfeit label stock having the same general number of fibers per a given area of paper. Any attempt to counterfeit the fiber-containing label through a printing-based process would fail since printing would not reproduce the fibers' dichroism, and even the fluorescence would be difficult to achieve.

Thus, at higher levels of authentication, the pattern of the fluorescent dichroic fibers is detected and archived during initial processing thereof (i.e., before the label is circulated). When a particular label is submitted for examination, a detector can be used to ascertain the fibers' position within the paper, as well as its dichroism, e.g., polarization angle, θ. A three-dimensional (i.e., x, y, θ) authentication mechanism can therefore easily be provided by using an imaging device, such as a CCD imaging array, with associated polarizer(s). This CCD imaging array may be an area array or line-scan array, the latter requiring a separate scanning system. The polarimeter may include fixed or rotating (variable) polarizers.

At a highest level of security and authentication, the marked label is measured before it is circulated to record the path (x, y), $\theta_{\lambda,x,y}$ (polarization angle at wavelength $\lambda$ at a position x,y) $A_{\lambda,x,y}$ (specific absorption at wavelength $\lambda$ at a position x,y), physical disposition of the fibers within the media (e.g., label). It would be very difficult to duplicate these parameters. This data, or a subset thereof, is formulated as a plain text message and encrypted into cipher text by an encryption algorithm, such as the triple 56 bit DES encryption algorithm or the RSA public key-private key algorithm. In the former case, the authentication requires a secure and trusted party, which holds a symmetric key. In the latter case, the public key is published, and may be used to decrypt the message to determine if it corresponds to the label characteristics.

Apparatus

Figure 2:
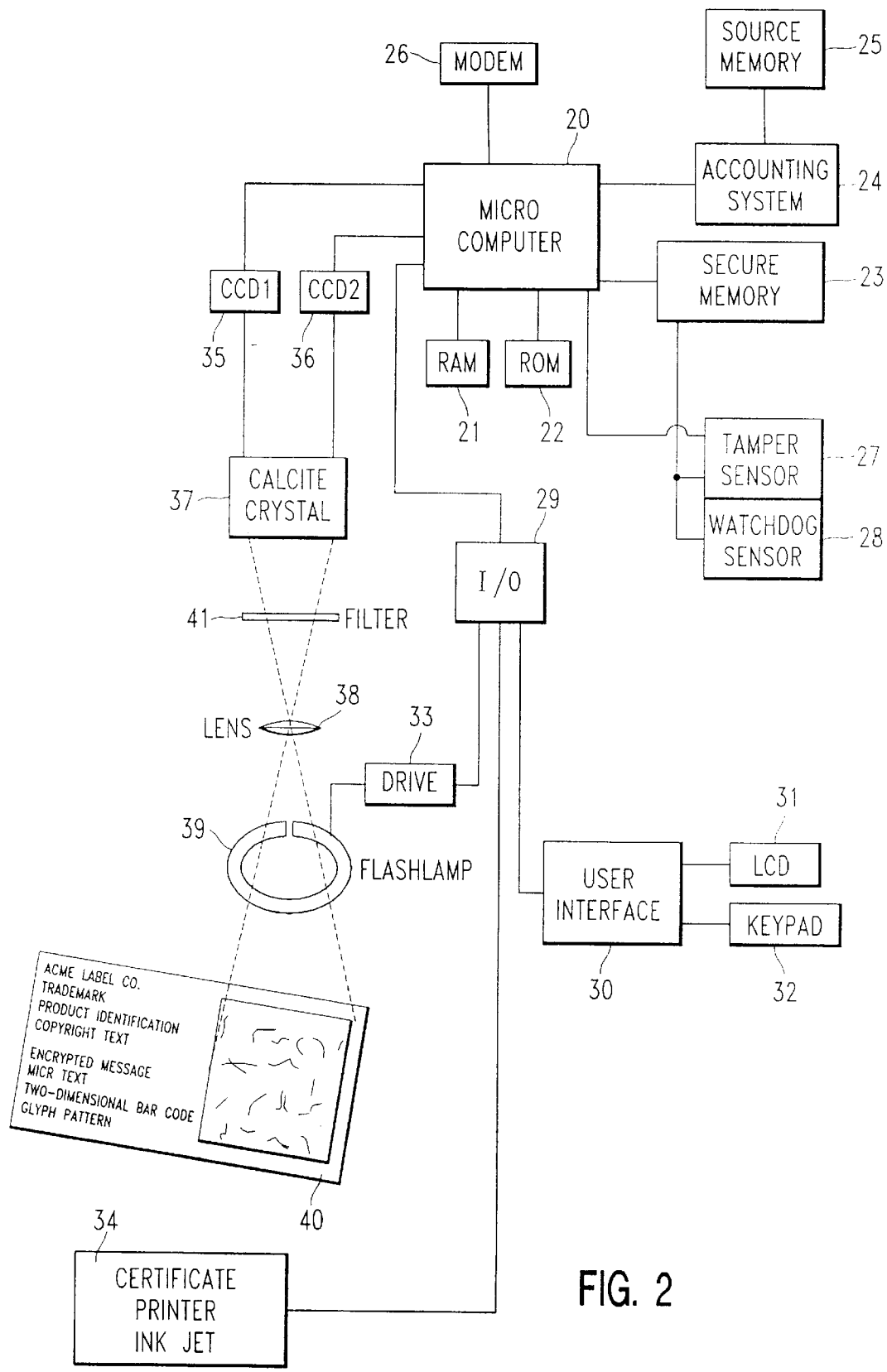
FIG. 2 is a schematic view of an authentication certificate generation system according to the present invention.
Figure 3:
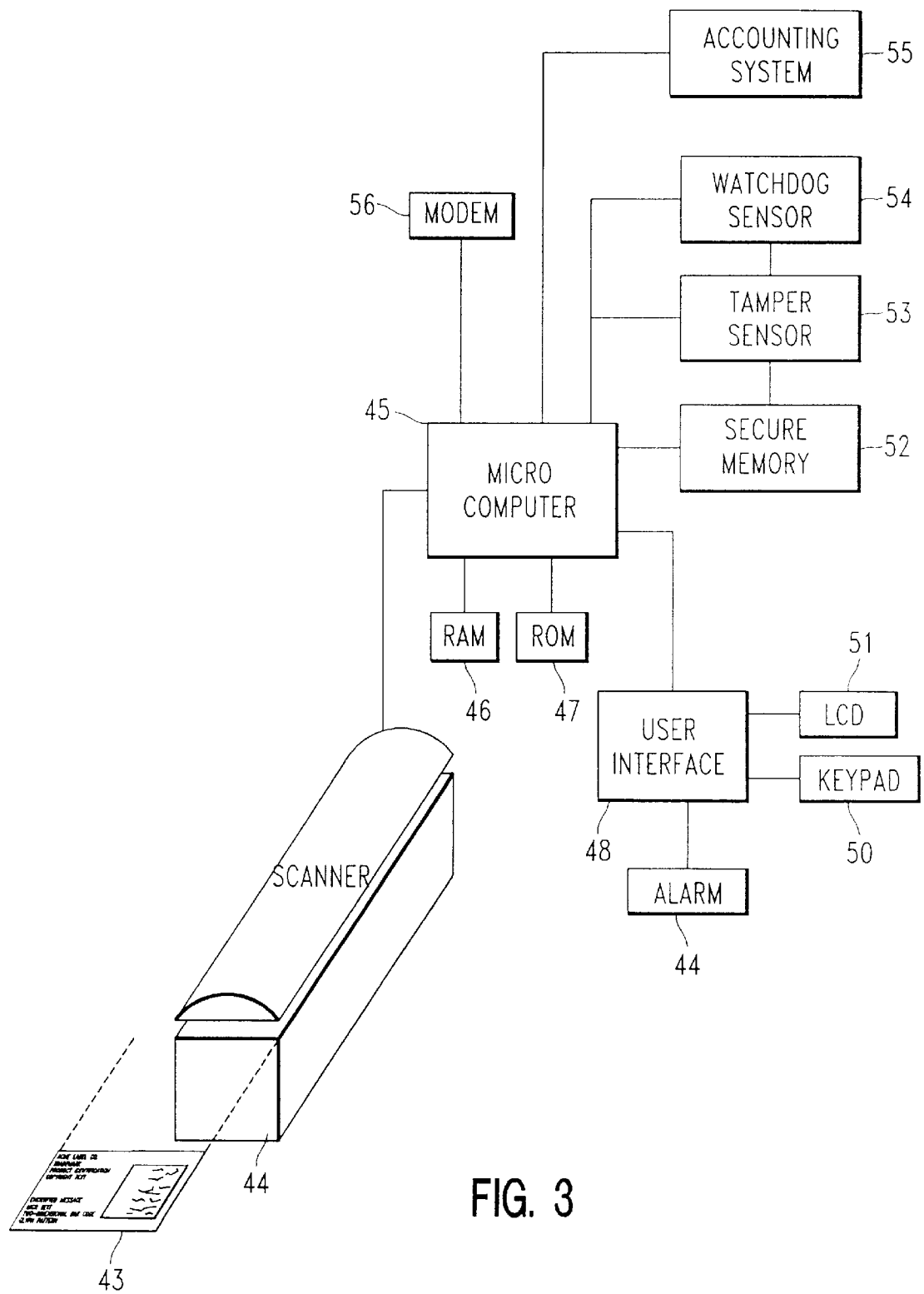
FIG. 3 is a schematic view of an authentication certificate reading system according to the present invention.

FIG. 2 shows a schematic representation of a detector suitable for use in an authentication system according to the present invention. This unit may be used both for reading the patterns of the indicator fibers during production (i.e., for archiving purposes), and/or provide the detection of the fibers in the media during the authentication of a specimen. FIG. 3 shows an authentication-only embodiment.

Circularly polarized radiation from a source 39, such as a laser beam, flashlamp, or light emitting diode at the absorption maxima of the dye is expanded and focused on the label 40. Fluorescent radiation emitted by the fibers is collected by a lens 38, isolated with a band pass filter 41 at the fluorescent wavelength, and imaged by a CCD imager system, which in this case includes a calcite crystal 37 (birefringent crystal) for separating light of differing polarization, and two CCD imagers 35, 36. Alternately, a moving or rotating polarizer or pair of cross polarizers may be present at either the light source or the imager, to allow resolution of the axis of polarization for each fiber to be analyzed, or for a small region of the label 40 which may contain any number of fibers. In fact, any known dichroism detection system may be employed. The fibers or areas are then mapped by location, fluorescent intensity, and polarization angle.

In another embodiment, a line scanner is provided with, for example, 300–1200 dpi resolution. Thus technology is similar to that employed in facsimile machines and hand-held image scanners. However, between the label 43 and the optical line scan sensor (not shown) is provided a polarizer, which is moved in synchrony with the relative motion of the label 43 and the optical line scan sensor. This polarizer mechanism effectively provides two different polarization states for the reading of the fibers, allowing calculation of a polarization axis.

Where multiple optical wavelengths are measured, the illumination wavelength is varied and/or the various filters either removed or provided with suitable replacements. The filters, in this case, may be integral to the detector, for example allowing use of a standard-type color CCD or CMOS image detector. In this case it is preferred that the wavelengths, e.g., fluorescent emissions, correspond to the filters employed in the standard-type sensor.

A typical algorithm for determining the polarization angle for each data point is Signal=(D2−D1)/(D2+D1)

where D2 is the intensity of the parallel-polarized light and D1 is the intensity of the perpendicular-polarized light. The absolute value of the signal is compared with a threshold value, which is defined by the anisotropy of the fiber and its local environment in the paper. The sum of D2 and D1 will also be compared against a threshold value to insure that the information is due to fluorescence (or luminescence) and not due to background signal or detector noise. By defining the signal as a ratio, errors due to source intensity fluctuations are eliminated. This allows measurement of variations in dichroism along the length of the fiber, especially where a binary pattern is represented.

In designing a detection system based upon fluorescent dichroic fibers, the fluorescence intensity from the paper (media) relative to the fiber establishes the optimal pixel size in the image; the background signal increases with the area of the pixel while the fiber emission signal increases with the linear dimension of the pixel. For example, an effective pixel dimension of 0.3×0.3 mm may provide an acceptable signal-to-noise ratio. It is noted that, where high throughput is not required, the image signal may be averaged over a number of illumination cycles, reducing nonspecific noise, and allowing a more accurate detection of dichroism; however, the background fluorescence is a signal, and will not be removed by averaging. On the other hand, the background is typically not dichroic, so that repeated or long timeperiod measurements may allow sensitive measurements of polarization angle.

Where the optical sensor has a pixel size smaller than the desired effective pixel dimension, a number of real pixels may be summed to yield an effective pixel. However, it is noted that more complex mathematical operations than summing may be used to obtain higher quality results. Further, if the optical sensor has a higher resolution than that required for most readings, an adaptive algorithm may be employed to optimize the data acquisition and analysis.

Where a laser is employed to illuminate the fluorescent dichroic fibers, the required photon power, $P_o$, from the laser head is given by the following equation:

$$P_o = S_d N_d / A_e Q_e d_f f_a I_e O_e$$

where $S_d$ is the photon power per detector element, $N_d$ is the number of detector elements, $A_e$ is the probability of photon absorption by the fluorophor, $Q_e$ is the quantum efficiency of the fluorophor, $d_f$ is the fraction of light collected by the detector optics, $f_a$ is the fraction of the pixel area occupied by the fiber, $I_e$ is the transmission efficiency of the input optical system, and $O_e$ is the transmission efficiency of the detector optical system.

Assuming that the background signal should be at least 10×the root-mean-square noise of the detector and preamplifier and 0.05 as the probability for $A_e$ and $Q_e$, we obtain a value of about 1 watt for $P_e$. With temporal averaging, lower average power illumination sources may be used, while maintaining reading throughput, for example about 5 to 60 readings per minute. This power is readily available from commercially available lasers, such as argon-ion, krypton, and diode lasers.

Self Authenticating Code

In one embodiment, the markings are encrypted using a self-authenticating code, and are thus processed with a key, e.g., a public key, to determine authenticity. Where the actual characteristics of the label and object form part of the encrypted message, the decrypted message is compared to the actual characteristics of the label and object. Thus, the authenticity may be determined. Alternately, the markings may include a code that identifies the object, allowing retrieval of information relating to the workpiece from a database, which may be local or remote. The database thus stores the characterizing information.

As shown in FIG. 2, a microcomputer 20 receives the signal from the CCD sensors 35, 36. These optical signals are processed according to a program, which may be stored in random access memory 21, read only memory 22 or secure memory 23. In generating an encrypted message, the keys are stored in secure memory only, and are not transmitted in a manner which would allow external interception or reading. In fact, the secure memory 23 may also include an encryption processor, which receives the clear text message and returns a cipher text message. The secure memory 23 module receives input from a tamper sensor 23 and a watchdog sensor 28. If either of these sensors detects an error condition, e.g., tampering or lack or recent reauthorization, they control the secure memory to erase (lose) its contents, especially the encryption key(s). The microcomputer 20 also receives inputs from these sensors. The encrypted message is transmitted by the microcomputer 20, through an interface, to the certificate printer 34, which in this case is an ink jet printer, which produces a bar code 9 and glyph pattern 10 on the label 40. The microcomputer 20 also provides a user interface 30 having an LCD display 31 and keypad 32 to allow, for example, entry of user authentication and authorization codes and for various types of programming. An accounting system 24 is provided, having its own secure memory 25, to allow secure transactions and to provide audit capability. For example, the device may be authorized for a certain number of label 40 prints between reauthorzations by a central control system. Thus, it is preferred that the encoding device have a communication device, e.g., modem 26, for communication with a central system to reset the watchdog sensor 28 timer and provide appropriate accounting and limitations on the use of the device. In the event of tampering, the secure memory 25 of the accounting system stores its contents and blocks substantial operations of the device.

In a second embodiment, the authentication process involves a remote system. Therefore, the markings are transmitted to a central system. The characteristics of the label and object are read or extracted and also transmitted to the central system. The central system then authenticates the marking and the characteristics, for example against a stored database of characteristics of marked label and object. The authentication result is then transmitted to the remote site.

As shown in FIG. 3, an authentication device, lacking printing capabilities, is shown. In this case, the scanner 44 represented is of a line scan-type, rather than the area sensor type shown in FIG. 2. The line scan sensor is typically slower than an area sensor, but potential less complex in construction and less expensive. This line-scan sensor is also used to read the encrypted message on the label 43. The signal from the optical sensor within the scanner 44 from reading the encoded label 43 is received by a microcomputer 45, which is associated with a random access memory 46 and a read only memory 47. As in the embodiment according to FIG. 2, a secure memory 52 stores the decryption key(s). In the case of an asymmetric encryption algorithm, the key(s) may differ from those employed by the encoding device, and indeed may be permissibly stored in a less secure manner. A tamper sensor 53 and watchdog sensor 54 monitor the physical and electronic use of the device to detect inappropriate use, such as attempts at reading the secure memory, using the device in an attempt to counterfeit a label, or using the device without continued authorization. An accounting system 55 is provided, which, in contrast to the embodiment of FIG. 2, does not require a highly secure memory. The accounting system, which may be a software construct of the microcomputer 45, monitors user, usage and optionally counterfeit tag readings. A modem 56 is provided for communication with a central system, such as to upload accounting system 55 data and obtain continued authorization by resetting the watchog sensor 54 timer. A user interface 48 includes optionally includes an LCD display 51, a keypad 50 and an alarm 44 or other output to indicate a device status, such as authentic label, counterfeit label, misread label, and the like.

Figure 4A:
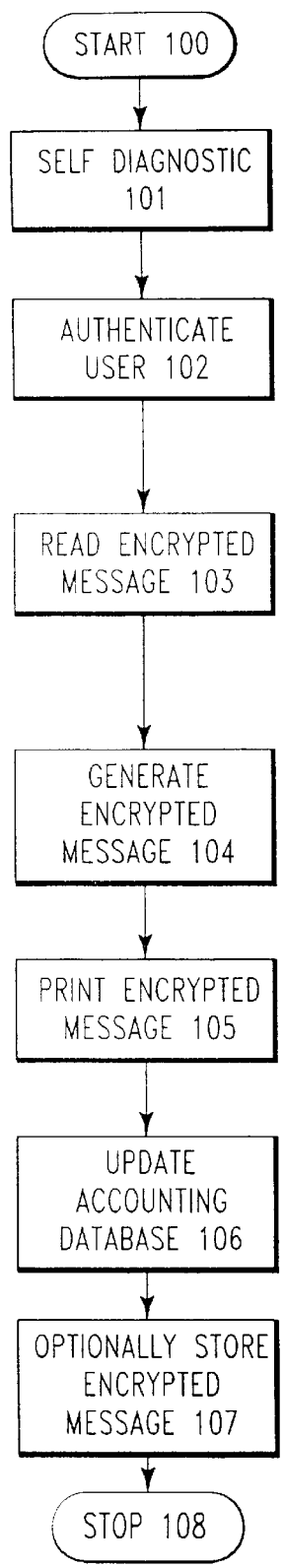
FIGS. 4A and 4B are flow diagram, respectively, of a method of generating and authenticating an authentication certificate.

FIG. 4A shows a flowchart detailing the operation of the encoding device. On starting an operation 100, the device first performs a self-diagnostic 101, which includes checking for memory corruption, sensor failure, watchdog timer timeout or tampering. If the system passes the self diagnostic, the user is then authenticated 102, and the pattern of dichroic fibers on the label is read 103. The system then generates an encrypted message encompassing a description of the pattern of dichroic fibers 104, which is printed on the label 105. The transaction data is then recorded in an accounting database 106. Optionally, the image and/or message is stored in a database 107. The system then returns to a state ready for the next operation 108.

Figure 4B:
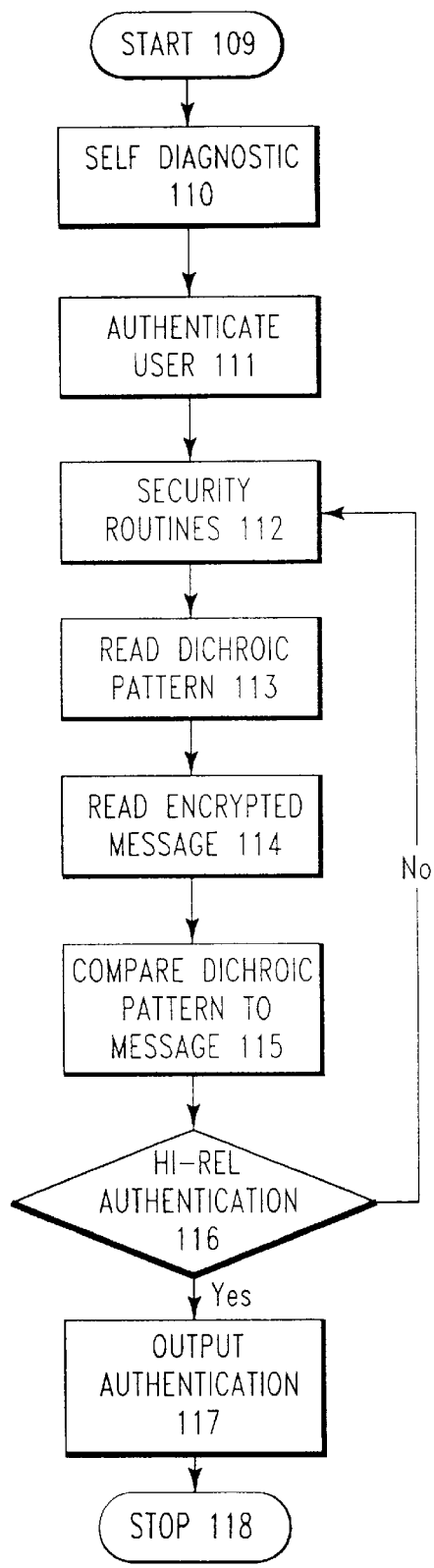

FIG. 4B shows a flowchart detailing the operation of the authentication device. On starting an operation 109, the device first performs a self-diagnostic 110, which includes checking for memory corruption, sensor failure, watchdog timer timeout or tampering. If the system passes the self diagnostic, the user is then authenticated 111, and security routines executed to detect inappropriate usage of the device, such as repeated attempts to authenticate an invalid or counterfeit label 112. The pattern of dichroic fibers on the label is read 113. The system then reads an encrypted message from the label 114, and compares the detected dichroic pattern with the encoded message 115, which is decoded internally to the authentication device. The processor within the authentication device then determines a reliability of the authentication 116, and outputs an indication of the authentication 117. Upon a failure of high reliability authentication, security routines are executed 112, to prevent use of the device to generate counterfeit labels or otherwise defeat the security provided. The system then returns to a state ready for the next operation 118.

Modulated Dot Boundaries

The presence or absence of a marking pixels at a set of coordinate locations generally defines the data pattern, while in more complex coding schemes, the data marking is not limited by pixel boundaries. In this case, markings are spaced discontinuously or partially overlapping, so that an outline or partial outline of each marking spot may be identified. Due to stochastic processes, the actual placement of the center of a marking, or its resulting outline may vary. However, the modulation pattern imposed may be greater in amplitude than the noise, or a differential encoding technique employed so that the noise is compensated. Thus, an array of spots on generally coordinate positions, with the exact positions modulated according to a pattern, is formed. In this case, without knowledge of the modulation scheme, it would be difficult to read the code, thus making it difficult to copy the code Further, to the extent that the noise amplitude is near the apparent precision of the marking device, a copying system may be very difficult to implement due to the very high precision required. It is noted that, to the extent random characteristics of the marking are encoded, for example an ink absorption pattern by paper fibers, the original marking system need not have the high precision detected by the detector, so long as the actual pattern is ultimately encoded on the label, for example by an additional message after a primary message is imprinted and analyzed.

Anti-Counterfeiting System

The present authentication label and reader combine to form a high security system to thwart counterfeiting in a wide range of applications. Billions of dollars are lost each year due to the fraudulent copying or unauthorized manufacturing of everything from clothing and apparel items to CDs and software. The present system allows for instant field verification of labels while maintaining a high level of security against counterfeiting by making the reverse engineering process extremely difficult and expensive. No two labels are ever alike, yet they can be produced very economically.

The authentication label system comprises a sheet of material, impregnated with dichroic fibers containing a fluorescent dye. The fiber pattern, which is random (irregular), is illuminated by a special light and read by a scanner during the production process. A code number, representing this pattern, is then printed on the label along with, for example, manufacturing information, such as serial number, date, location, lot number, copyright notice, and other product information. The code is based on a secure algorithm, with encoding specific to each manufacturer using the label system.

In the field, it is possible for an inspector to validate the pattern (authenticate the label) with a hand held scanner. The label is authentic only if the scanner determines that the characteristics of the label and accompanying goods correspond with the printed code on the label, which may be, for example, by displaying a number, which is manually compared with the imprinted code. Alternately, the scanner can read the code and provide a go/no-go indication. For example, a bar code can even be added to make the validation process completely automatic.

Production of a counterfeit label requires duplication not only of the length and width of the dichroic fibers and the fluorescent dye, it also requires either duplication of fiber location and dichroism orientation, or knowledge of the encoding algorithm, which is held as a secret.

Image Processing

The scanned pattern on the certificate is captured as a set of pixels, and represented internally in the image processor as an image projected on a surface, with the surface not necessary being constrained as a planar sheet. This processor may provide a raster-to-vector conversion process. The printed code is also imaged, and captured by the processor, for example by optical character recognition, bar code recognition, pattern recognition, magnetically ink coded recording (MICR) reader, or other known means. The projected image is then compared with the ideal image represented by the code printed on the certificate. A stochastic analysis is performed of the types and magnitudes of any deviations, as well as correlations of deviations from the ideal. The deviation pattern, as well as any other deviations from the encoded patterns, which for example represent lost or obscured fibers, noise, environmental contamination with interfering substances, errors or interference in the original encoding process, etc., are then used to determine a likelihood that the certificate itself corresponds to the originally encoded certificate. Thus, the determined authenticity is associated with a reliability thereof, based on stochastic variations in the properties of the authentication certificate and stochastic variations in the generation of the associated secure code. A threshold may then be applied to define an acceptable error rate (false positive and false negative) in the authentication process. The reliability of the authentication or a go/no-go indication is then output.

In order to avoid the requirement for encrypting an entire or substantial portion of a representation of an image of the certificate, the medium may be subdivided into a plurality of regions, each region associated with a vector, which, for example is two-dimensional or of higher dimensionality. The vector, which represents an irreversible compression of data derived from the region, is then encoded and encrypted in the encrypted message. For verification, the vector mapping is decrypted and unencoded from the recorded message. The medium is then scanned, and an analogous vector mapping derived from the newly scanned image. The recorded vector map is compared with the measured vector map, allowing a correlation to be determined. In this case, given the large number of degrees of freedom, e.g., a polarization vector for each region or zone, even relatively large deviations between the recorded and measured vector maps may be tolerated in the authentication process. Thus, an initial deskewing and dewarping algorithm may be use to initially align the regional boundaries to achieve maximum cross-correlation. Such algorithms and image processing systems are known in the art. A cross correlation of even 0.1 over tens or hundreds of degrees of freedom may be sufficient to allow highly reliable authentication with a low number of false positives and false negatives.

The label may thus be subdivided into a plurality of zones, each associated with an encrypted code portion. In this case, since each subdivided zone stands alone, any such zone or set of zones with sufficient degrees of freedom may be used to authenticate the entire label. Where the zones are small or have a limited number of degrees of freedom, the reliability of authentication of the entire label by any one zone may be insufficient. Therefore, a plurality of zones may be authenticated, with each authenticated zone adding to the reliability of the resulting authentication. Any zones that fail to authenticate may also be weighted into the analysis, although typically with a lower weight than zones that correctly authenticate.

There have thus been shown and described novel receptacles and novel aspects of anticounterfeit systems, which fulfill all the objects and advantages sought therefor. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An authentication system comprising:
   (a) a medium having a plurality of elements, each element having an irregularity selected from the group consisting of one or more of an irregular spatial arrangement and an irregular characteristic, and having a determinable intrinsic attribute distinct from a two-dimensional chroma-luminance map;
   (b) a detector, detecting said attribute and position, with respect to a positional reference, of the plurality of elements, including said irregularity;

(c) a processor for generating an encrypted message including at least a portion of the attribute and position of the plurality of elements, including a description of said irregularity; and (d) a recording system for recording the encrypted message in physical association with the medium.

2. The system according to claim 1, wherein the irregularity of the plurality of elements comprises an irregular arrangement of elements on the medium.

3. The system according to claim 1, wherein the irregularity of the plurality of elements comprises an irregular characteristic of a respective element.

4. The system according to claim 1, wherein the irregularity of the plurality of elements comprises both an irregular arrangement of elements on the medium and an irregular characteristic of each respective element.

5. The system according to claim 1, wherein the attribute comprises a directional vector of a characteristic of a respective element.

6. The system according to claim 1, wherein the detector detects a vector mapping of locations and an associated directional vector of the elements.

7. The system according to claim 1, wherein the encrypted message is encoded in such a manner that the encrypted portion of the attribute and respective position may be recovered therefrom.

8. The system according to claim 1, wherein the encrypted message is encoded in compressed form to preclude complete decoding of the attributes and respective positions of the elements.

9. The system according to claim 1, wherein the medium is logically subdivided into a plurality of regions, wherein an attribute and respective position of the plurality of elements is detected and encoded separately for each region, as a basis for forming the encrypted message.

10. The system according to claim 9, wherein the encrypted message is generated by a process comprising irreversible compression of data representing a mapping of respective positions and associated attributes of the plurality of elements, wherein a separate code is generated for each region of the medium, defining a mathematical function of positions and associated attributes of the plurality of elements within that region.

11. The system according to claim 1, further comprising a processor for determining a correspondence of the recorded encrypted message and a detected attribute and position of the plurality of elements.

12. The system according to claim 1, further comprising a processor for determining a correspondence and an associated reliability, between the recorded encrypted message and the detected attribute and position of the plurality of elements.

13. The system according to claim 1, wherein the plurality of elements comprise fiber exhibiting dichroism, the attribute comprising an optical polarization angle.

14. The system according to claim 1, wherein the plurality of elements comprise fiber exhibiting dichroism, the attribute comprising an optical polarization angle, the irregularity comprising a variation in a characteristic selected from one or more of the group consisting of dye intensity and dichroism over length of the fiber.

15. The system according to claim 1, wherein the plurality of elements comprise fiber exhibiting dichroism, the attribute comprising an optical polarization angle, and wherein the medium comprises a woven mesh in which the fiber elements are incorporated.

16. The system according to claim 1, wherein the elements comprise fiber exhibiting dichroism, the attribute comprising an optical polarization angle, wherein the medium is a fabric forming part of an article of clothing.

17. The system according to claim 1, wherein the medium comprises a non-woven sheet, wherein the element comprises fiber exhibiting dichroism and a variation in dye intensity.

18. The system according to claim 1, wherein the medium comprises paper.

19. The system according to claim 1, wherein the elements are deposited on the medium by a printing process.

20. The system according to claim 1, wherein the processor further receives a parameter, distinct from said elements, relating to an object associated with the medium, and encrypts the message based on the detected attribute and respective position of the plurality of elements and the parameter.

21. The system according to claim 1, wherein the object and medium each comprise woven fabric, the element comprising a fiber exhibiting dichroism and the attribute being an optical polarization angle of the fiber, wherein the processor further receives a physical parameter relating to an object associated with the medium, and encrypts the message based on the detected attribute and respective position of the plurality of elements and the parameter.

22. The system according to claim 1, wherein the element comprises fiber exhibiting dichroism and the attribute comprises an optical polarization angle, wherein the dichroism is exhibited at characteristic wavelengths of a dye within the fiber, wherein a concentration of dye varies over length of the fiber.

23. The system according to claim 22, wherein variations in fiber dye concentration are effected by varying a dye concentration over length during formation of the fiber.

24. The system according to claim 22, wherein variations in fiber dye concentration are effected by altering the dye concentration after formation of the fiber.

25. The system according to claim 24, wherein the dye concentration of the fiber is altered by a bleaching process.

26. The system according to claim 1, wherein the elements comprise fiber exhibiting dichroism and the attribute comprises an optical polarization angle, wherein the optical polarization angle varies over the length of a fiber.

27. The system according to claim 26, wherein the variations in optical polarization angle are effected by a mechanical deformation of the fiber.

28. The system according to claim 26, wherein the variations in optical polarization angle are effected by a thermal process applied to a formed fiber.

29. The system according to claim 1, wherein the processor encrypts a plurality of messages, the plurality of messages differing in respective algorithmic degree of computational complexity.

30. The system according to claim 1, wherein the processor stores an encryption algorithm in a volatile memory, and further deletes the contents of the volatile memory upon detection of attempted unauthorized access or use of the processor.

31. The system according to claim 1, wherein the processor is associated with an identification, wherein the encrypted message further includes the associated identification.

32. The system according to claim 1, wherein the plurality of elements comprise fluorescent dichroic fibers having a fluorescent dye within a polymer matrix, selectively absorbing light having a first wavelength and fluorescing light having a characteristic polarization angle at a second wavelength.

33. The system according to claim 1, wherein said irregularity includes a degree of freedom which cannot be characterized by a circularly polarized light sensor.

34. An authentication system comprising:
(a) an authentication certificate having anisotropic optical properties;
(b) a secure code associated with the authentication certificate defining the anisotropic optical properties based on a received input characterizing the anisotropic optical properties;
(c) an optical system for reading the anisotropic optical properties of the authentication certificate; and
(d) a processor for comparing the read anisotropic optical properties of the authentication certificate with the associated secure code to determine an authenticity of the authentication certificate, the authenticity being associated with a reliability thereof, based on:
stochastic variations in the read anisotropic optical properties of the authentication certificate, and
stochastic variations in the received input used for generation of the associated secure code.

35. The system according to claim 34, wherein the secure code is a public-key/private-key authentication code.

36. The system according to claim 34, wherein the anisotropic optical properties are imparted to the certificate by visible dichroic fibers.

37. The system according to claim 36, wherein the dichroic fibers vary in one or more characteristics selected from the group consisting of optical polarization angle, optical polarization angle variations over length, dye concentration, and dye concentration variations over length.

38. A method for authenticating a medium, comprising:
(a) providing a medium having a plurality of elements, the elements being distinctive, detectable and irregular, each element being characterized by a determinable intrinsic attribute distinct from a two-dimensional coordinate representation of simple optical absorption or simple optical reflection intensity;
(b) detecting an attribute and position of the plurality of elements, with respect to a positional reference;
(c) generating an encrypted message including at least a portion of the attribute and position of the plurality of elements; and
(d) recording the encrypted message in physical association with the medium.

39. The method according to claim 38, further comprising the steps of: reading and decrypting the message in physical association with a medium to be authenticated;
detecting an attribute and a position of a plurality of elements of the medium to be authenticated, with respect to a positional reference of the medium to be authenticated; and
comparing the portion of the attribute and position of the plurality of elements from the message with the detected attribute and position of the plurality of elements of the medium to be authenticated.

40. The method according to claim 39, further comprising the step of determining a reliability of an authentication based on statistical tolerances.

41. The method according to claim 38, wherein said attribute is distinct from a two-dimensional coordinate representation of optical polarization independent absorption or optical polarization independent reflection intensity.

42. An authentication system comprising:
(a) a medium comprising a plurality of physical elements, said plurality of physical elements having a spatial arrangement and respectively nonuniform optical characteristics distinct from a two-dimensional chroma-luminance map of said medium;
(b) a detector, detecting a spatial arrangement of said nonuniform element characteristics of a said plurality of elements;
(c) a processor for generating an encrypted message including at least a partial description of at least a portion of said arrangement of nonuniform element characteristics of the plurality of elements; and
(d) a recording system for recording the encrypted message in physical association with the medium.

43. The authentication system according to claim 42, wherein said nonuniform element characteristics comprise optical anisotropism.

44. The authentication system according to claim 42, wherein said message encodes an identification of said processor.

45. An authentication system comprising:
(a) a medium having a plurality of elements, said plurality of elements having irregularities;
(b) a detector, detecting said irregularities;
(c) a processor for generating a plurality of encrypted messages, each defining at least a portion of said irregularities, said plurality of messages differing in respective algorithmic degree of computational complexity; and
(d) a recording system for recording the encrypted message in physical association with the medium.

46. A method for authenticating a medium, comprising:
(a) providing a medium having a plurality of elements, each element being characterized by a determinable irregular intrinsic attribute distinct from a two-dimensional coordinate representation of simple optical absorption or simple optical reflection intensity;
(b) detecting the irregular attribute and position of the plurality of elements, with respect to a positional reference;
(c) decrypting an encrypted message including at least a portion of the attribute and position of the plurality of elements, recorded in physical association with the medium; and
(d) comparing the decrypted message with the detected attribute and position, to determine an authenticity of the medium.

47. The method according to claim 46 wherein said comparing step includes the substep of evaluating a statistical reliability of said comparison.

48. The method according to claim 46, further comprising the step of decoding an identification of an encoding processor from the encrypted message.

49. The method according to claim 46, wherein the encrypted message defines vector characteristics of the plurality of elements.

50. A method for authenticating a medium, comprising:
(a) providing a medium having a plurality of elements, said plurality of elements having irregularities;
(b) detecting an the irregularities;
(c) decrypting an encrypted message, selected from one or more of a plurality of encrypted messages recorded in physical association with the medium, each including at least a portion of the attribute and position of the plurality of elements, said plurality of messages differing in respective algorithmic degree of computational complexity; and
(d) comparing at least one decrypted message with the detected attribute and position, to determine an authenticity of the medium.

51. A self-authenticating medium, comprising:
(a) a plurality of elements, said plurality of elements having irregularities, each element having an associated vector characteristic intrinsic attribute; and
(b) an encrypted message recorded in physical association with said medium, said message describing at least a portion of the vector characteristic and position of the plurality of elements.

52. The self-authenticating medium according to claim 51, wherein said irregularities comprise anisotropic optical characteristics.

* * * * *